United States Patent [19]
Yamaguchi et al.

[11] Patent Number: 5,604,807
[45] Date of Patent: Feb. 18, 1997

[54] SYSTEM AND SCHEME OF CIPHER COMMUNICATION

[75] Inventors: Toshikazu Yamaguchi; Kiyoto Tanaka, both of Kanagawaken, Japan

[73] Assignee: Nippon Telegraph and Telephone Corporation, Tokyo, Japan

[21] Appl. No.: 425,904

[22] Filed: Apr. 20, 1995

Related U.S. Application Data

[62] Division of Ser. No. 319,449, Oct. 6, 1994.

[30] Foreign Application Priority Data

Oct. 6, 1993 [JP] Japan .................................. 5-250851

[51] Int. Cl.$^6$ ........................................................ H04L 9/12
[52] U.S. Cl. .................................. 380/48; 380/21
[58] Field of Search ........................................... 380/21, 48

[56] References Cited

U.S. PATENT DOCUMENTS

| | | | |
|---|---|---|---|
| 5,144,667 | 9/1992 | Pogue, Jr. et al. | 380/45 |
| 5,341,426 | 8/1994 | Barney et al. | 380/21 |
| 5,375,169 | 12/1994 | Seheidt et al. | 380/21 |
| 5,377,270 | 12/1994 | Koopman, Jr. et al. | 380/25 |
| 5,384,848 | 1/1995 | Kikuchi | 380/48 |

*Primary Examiner*—Gilberto Barron, Jr.
*Attorney, Agent, or Firm*—Banner & Witcoff, Ltd.

[57] ABSTRACT

A cipher communication system and scheme capable of realizing the cipher communication without affecting the already existing application programs and hardware, and establishing a synchronization at the start and end of the cipher communication. In the cipher communication, the session key generated by the key distribution center are obtained and shared at the first and second terminals at a timing of a request for establishing a cipher communication session between the first and second terminals, and then the cipher communication between the first and second terminals is carried out by using the shared session key. The synchronization at the start and end of the cipher communication is established by the matching of the synchronization data transmitted from the first terminal to second terminal or its enciphered form with the return data from the second terminal to the first terminal which is either the synchronization data as received at the second terminal, or its enciphered form depending on the communication state of the second terminal.

6 Claims, 19 Drawing Sheets

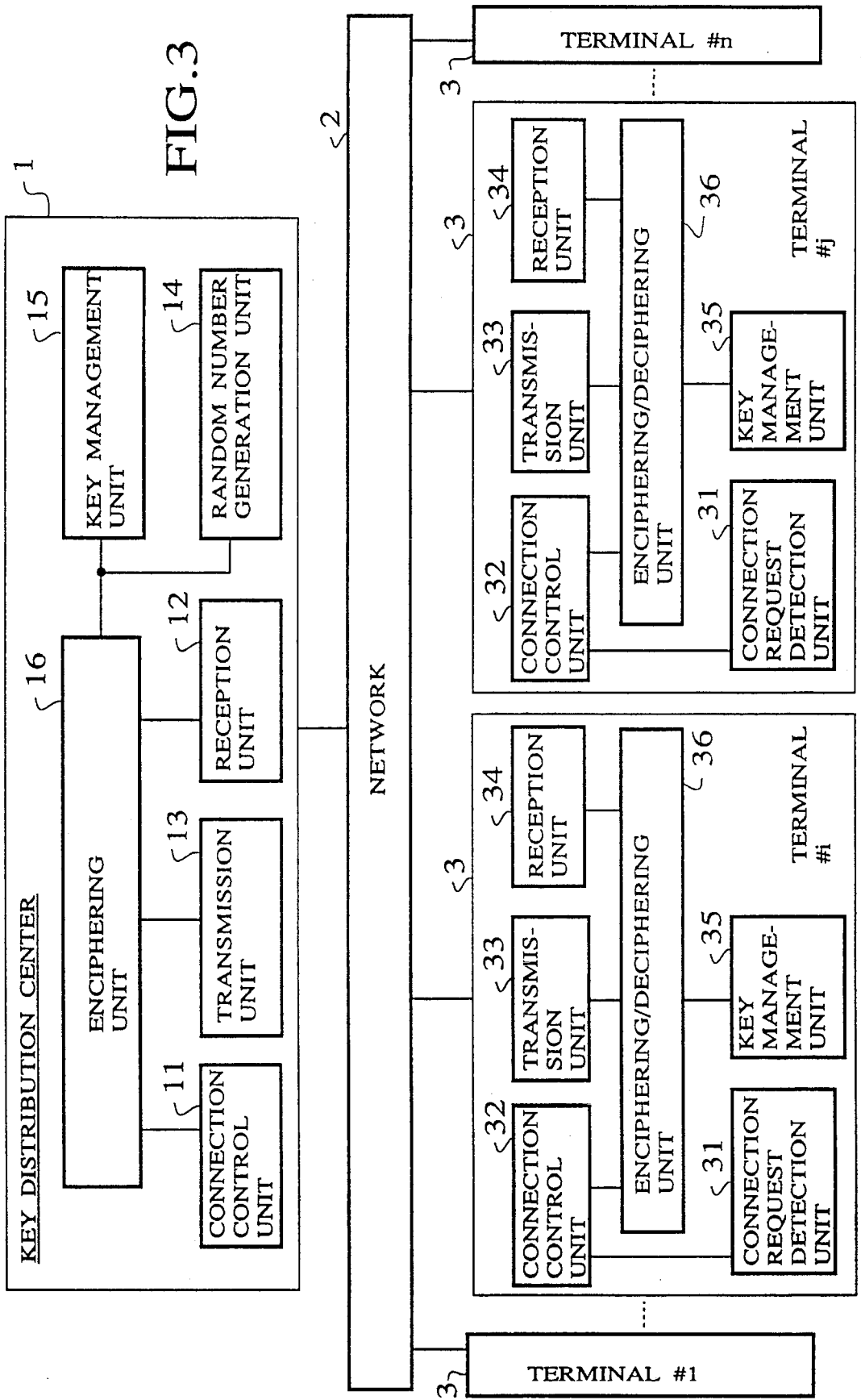

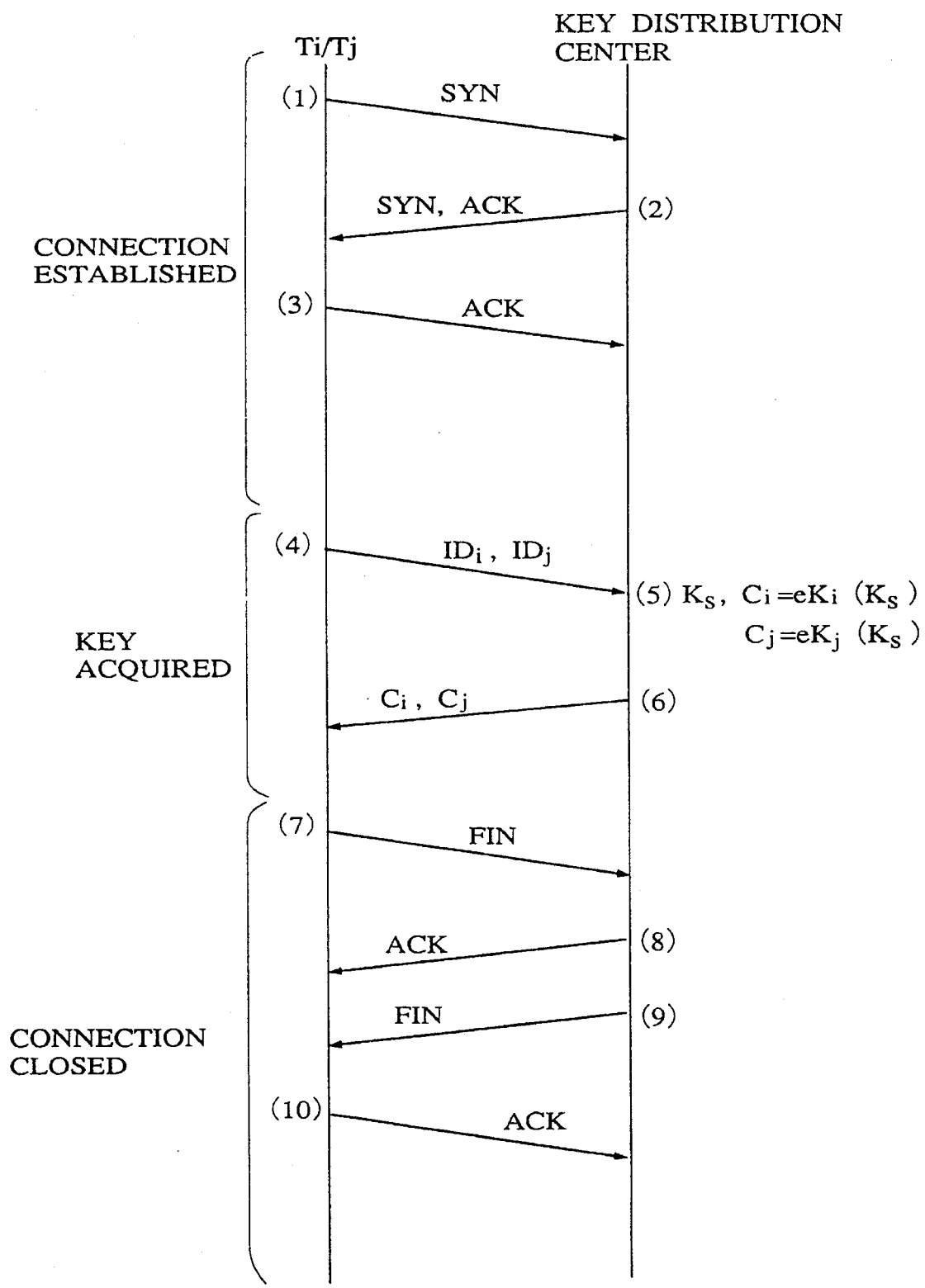

FIG.21

| TERMINAL ID | PORT NUMBER |
|---|---|
| $IP_1$ | $P_1$ |
| $IP_2$ | $P_2$ |
| ..... | ..... |
| $IP_n$ | $P_n$ |

SYSTEM AND SCHEME OF CIPHER COMMUNICATION

RELATED APPLICATION

This application is a division of application Ser. No. 08/319,449 filed Oct. 6, 1994 and entitled System and Scheme of Cipher Communication pending.

BACKGROUND OF THE INVENTION

1. Field of the Invention

The present invention relates to a cipher communication In which a communication between two terminals with a connection is realized by using a shared key cipher algorithm.

2. Description of the Background Art

The cipher communication system using a shared key cipher algorithm can be effectively utilized in realizing the cipher communication within a specific group of members such as business offices which are distributed over a wide range of regions as In a case of the LAN (Local Area Network).

In the conventional cipher communication system, a plurality of terminals are connected with a key distribution center through a network, and a connection between any two terminals is established and the cipher communication between them is realized by obtaining a session key generated by the key distribution center. Here, in general, after the connection with a communication target terminal is established, an application program of one communication side makes an access to the key distribution center to acquire the session key to be used in the cipher communication, and this session key is transmitted to the communication target terminal such that this key is commonly shared and the cipher communication is realized by enciphering and deciphering the communication data by using this commonly shared key thereafter.

For example, a conventional cipher communication system has an exemplary configuration as shown in FIG. 1, in which a plurality of clients $3_1$ to $3_3$ and a server 5 are connected with a key distribution center 1 through a network 2 such that the client 3 or the server 5 can obtain the session key generated by the key distribution center 1.

In this conventional cipher communication system of FIG. 1, in a case of requesting the session key to the key distribution center 1 from the client 3 by using its application program, the cipher communication is realized by the procedure as shown in FIG. 2A, whereas in a case of requesting the session key to the key distribution center 1 from the server 5 by using its application program, the cipher communication is realized by the procedure as shown in FIG. 2B. Namely, after the session is established between the client 3 and the server 5, the client 3 or the server 5 obtains the session key to be used in communication by making an access from the application program to the key distribution center 1, and the obtained session key is shared between the client 3 and the server 5, such that the cipher communication is realized by enciphering and deciphering the communication packets by using this session key thereafter.

However, in such a conventional cipher communication scheme, before the cipher communication begins, there is a need for the application program executed on the terminal to establish a connection with the key distribution center, acquire the session key from the key distribution center, and transmit the same session key to the application program on the communication target terminal.

On the other hand, an enormous number of communication programs for carrying out communications among terminals through a connection oriented network are presently available, and in order to modify these communication programs to be compatible with the cipher communication, there is a need to remodel each application program as well as a hardware of a client or a server separately, so that the scale of remodelling as well as a process of remodelling are going to be considerable and in conjunction with these, a considerable sum of development costs are going to be required.

Now, the cipher communication described above is an effective security measure in the digital communication through a digital transmission path. In the cipher communication, the sender side and receiver side commonly share a predetermined identical cipher algorithm and a cipher key to be used in the cipher communication, and in general, the cipher communication is started and ended at some specific timings.

The cipher algorithm used in the conventional cipher communication includes FEAL (Fast data Encipherment ALgorithm), DES (Data Encryption Standard), etc., while a cipher key sharing scheme used in the conventional cipher communication includes the terminal-to-terminal key sharing scheme in which the key is exchanged between terminals, and the center key distribution scheme using a key distribution center. See, "Revised text of CD 9798-2, Entity authentication mechanisms, Part 2: Entity authentication using symmetric techniques, ISO/IEC/DP9798-2: 1990(E)" for further details.

As for a synchronization establishing scheme for the start and end of the cipher communication using stream data such as speech data through the digital transmission path, there has been a proposition of a scheme in which the sender side is set in the cipher communication state after transmitting a specific bit pattern indicating the start of the cipher communication at a timing for starting the cipher communication, while the receiver side is set in the cipher communication state when this specific bit pattern indicating the start of the cipher communication transmitted from the sender side is detected. See, Japanese Patent Application No. 2-192514 (1990).

On the other hand, as a scheme for establishing a synchronization of the cipher communication start/end for the data in the data communication, there is a scheme for regarding the data in the data communication as the stream data by using the physical layer as a unit of cipher processing Just as in a case of the speech data, and the synchronization is established in the substantially similar manner as in a case of the speech data described above.

However, in this conventional synchronization establishing scheme for the start and end of the cipher communication of the data in the data communication, the encipher/decipher processing is applied directly to the digital data of the physical layer, so that when the bit error occurs on the transmission path, there are cases in which the synchronization processing or the error correction at the data link layer cannot be carried out.

For example, in a case of adopting the HDLC procedure as the protocol of the data link layer, the frame synchronization is realized by using the F pattern constituting the frame. Then when the FEAL is used as the cipher algorithm, one bit error on the transmission path can be enlarged to 64 bits in the deciphered result depending on the cipher mode such that the F pattern itself contains an error, in which case the synchronization processing at the layer 2 is impossible.

Also, in a case of using the ISDN (Integrated Service Digital Network) line as the digital transmission line, if the encipher/decipher processing is applied to the physical layer data of the data in the data communication, this scheme becomes inapplicable when there is a need for the exchanger to interpret the content of the data channel as in the communication by the packet exchange. Consequently, the target of the cipher processing of the data in the data communication must be selected from the data other than that of the data link layer (see, K. Tanaka, I. Oyaizu, "A Confidentiality System for ISDN inter-PC High-Speed File Transfer", IEEE INFOCOM '94 proceedings, Vol. 3, pp. 1270–1277 (1994), and in such a case the synchronization establishing scheme for the cipher processing of the stream data such as speech data cannot be utilized.

SUMMARY OF THE INVENTION

It is therefore an object of the present invention to provide a cipher communication system and scheme capable of realizing the cipher communication without affecting the already existing application programs and hardware.

It is another object of the present invention to provide a synchronization establishing scheme for the start and end of the cipher communication suitable for a case of transferring data in the data communication through a digital transmission path.

According to one aspect of the present invention there is provided a method of cipher communication, comprising the steps of: connecting a plurality of terminals with a key distribution center through a network; generating a session key to be used in a cipher communication between first and second terminals among said plurality of terminals at the key distribution center; obtaining and sharing the session key generated by the key distribution center at the first and second terminals at a timing of a request for establishing a cipher communication session between the first and second terminals; and carrying out the cipher communication between the first and second terminals by establishing the cipher communication session between the first and second terminals and using the session key obtained at the obtaining step.

According to another aspect of the present invention there is provided a cipher communication system, comprising: a plurality of terminals including first and second terminals for carrying out a cipher communication by establishing a cipher communication session between the first and second terminals; and a key distribution center, connected with said plurality of terminals through a network, for generating a session key to be used in the cipher communication between first and second terminals; wherein each terminal includes detecting means for detecting a request for establishing the cipher communication session between the first and second terminals such that the session key generated by the key distribution center is obtained and shared by the first and second terminals at a timing of the request for establishing the cipher communication session between the first and second terminals detected by the detecting means.

According to another aspect of the present invention there is provided a method of cipher communication between first and second terminals, comprising the steps of: generating a synchronization data at the first terminal, and transmitting the synchronization data from the first terminal to the second terminal after setting a communication state of the first terminal with respect to the second terminal as a cipher/non-cipher communication state; checking a communication state of the second terminal with respect to the first terminal when the synchronization data transmitted from the first terminal is received at the second terminal; returning a return data from the second terminal to the first terminal, the return data being provided by an enciphered synchronization data obtained by enciphering the synchronization data as received at the second terminal when the communication state of the second terminal with respect to the first terminal is the cipher/non-cipher communication state at the checking step, and by the synchronization data as received at the second terminal when the communication state of the second terminal with respect to the first terminal is not the cipher/non-cipher communication state at the checking step; and starting/ending the cipher communication at the first terminal only when the return data returned at the returning step is equal to the enciphered synchronization data obtained by enciphering the synchronization data generated at the generating step.

According to another aspect of the present invention there is provided a method of cipher communication between first and second terminals, comprising the steps of: generating a synchronization data at the first terminal, and transmitting the synchronization data from the first terminal to the second terminal after setting a communication state of the first terminal with respect to the second terminal as a non-cipher/cipher communication state; checking a communication state of the second terminal with respect to the first terminal when the synchronization data transmitted from the first terminal is received at the second terminal; returning a return data from the second terminal to the first terminal, the return data being provided by the synchronization data as received at the second terminal when the communication state of the second terminal with respect to the first terminal is the non-cipher/cipher communication state at the checking step, and by an enciphered synchronization data obtained by enciphering the synchronization data as received at the second terminal when the communication state of the second terminal with respect to the first terminal is not the non-cipher/cipher communication state at the checking step; and ending/starting the cipher communication at the first terminal only when the return data returned at the returning step is equal to the synchronization data generated at the generating step.

Other features and advantages of the present invention will become apparent from the following description taken in conjunction with the accompanying drawings.

BRIEF DESCRIPTION OF THE DRAWINGS

FIG. 3 is a block diagram of a first embodiment of a cipher communication system according to the present invention.

FIG. 8 is a sequence chart for a key acquisition procedure in the sequence charts of FIGS. 7A to 7C.

FIG. 21 is a diagrammatic illustration of a table that can be used in the system of FIG. 9.

DETAILED DESCRIPTION OF THE PREFERRED EMBODIMENTS

Figure 1:
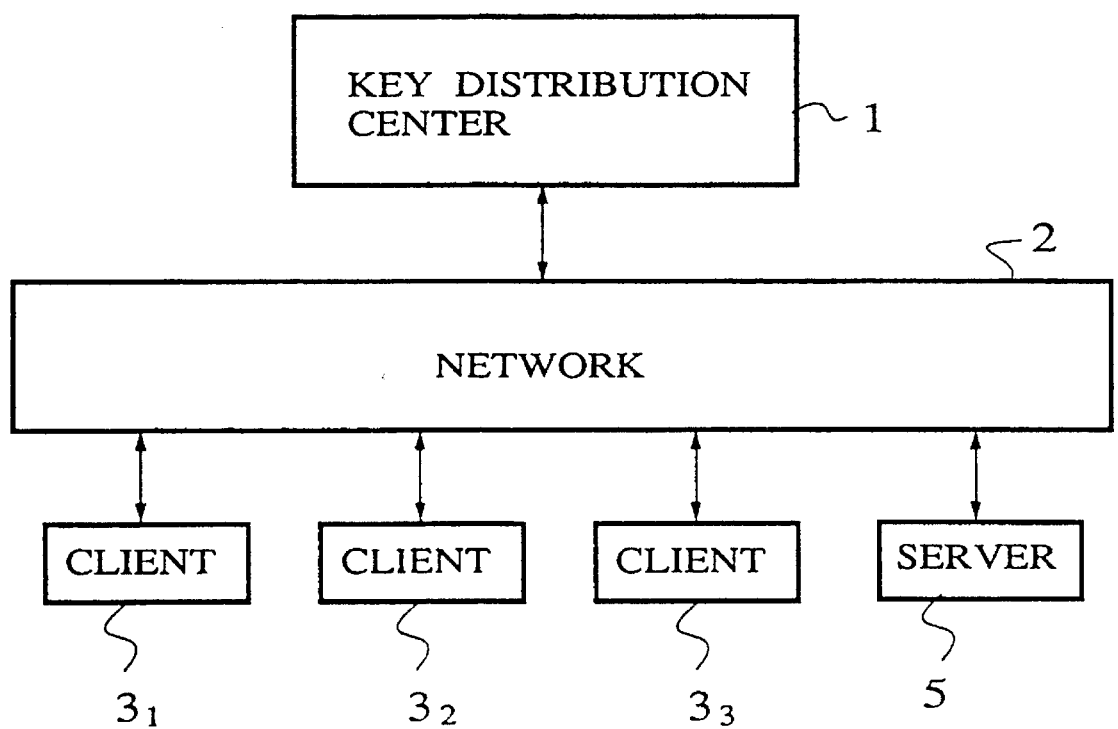
FIG. 1 is a schematic block diagram of a conventional cipher communication system.
Figure 2A:
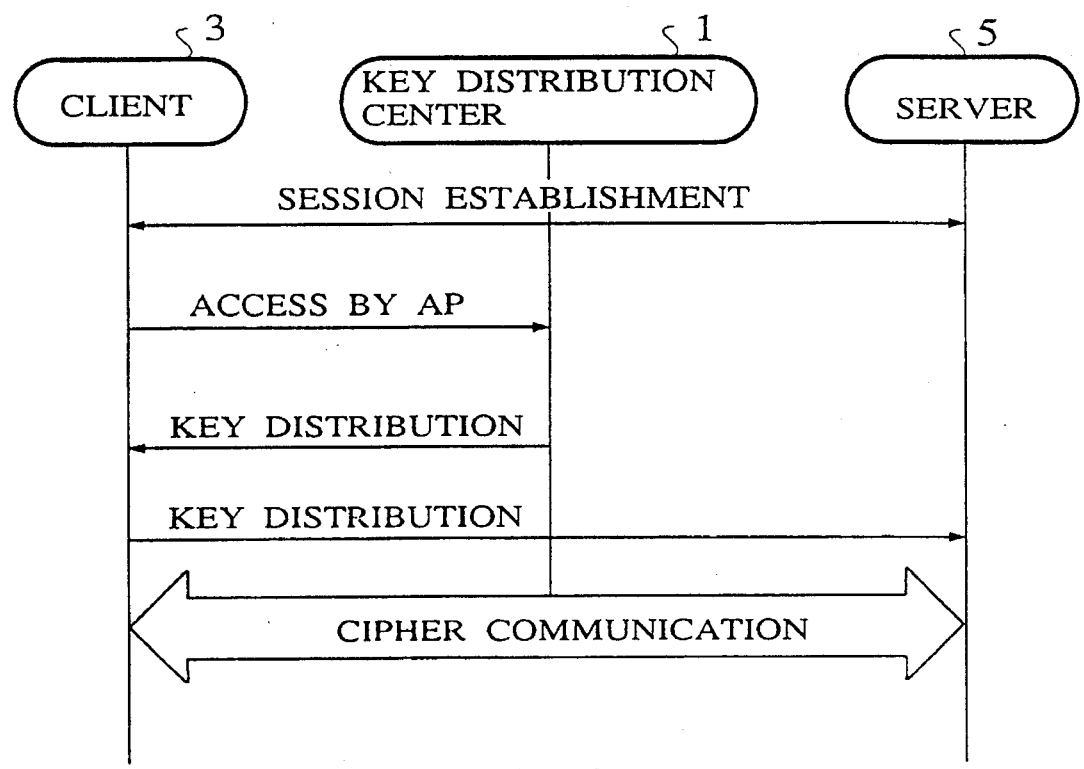
FIGS. 2A and 2B are sequence charts for the procedures of the cipher communication in the conventional system of FIG. 1.
Figure 2B:
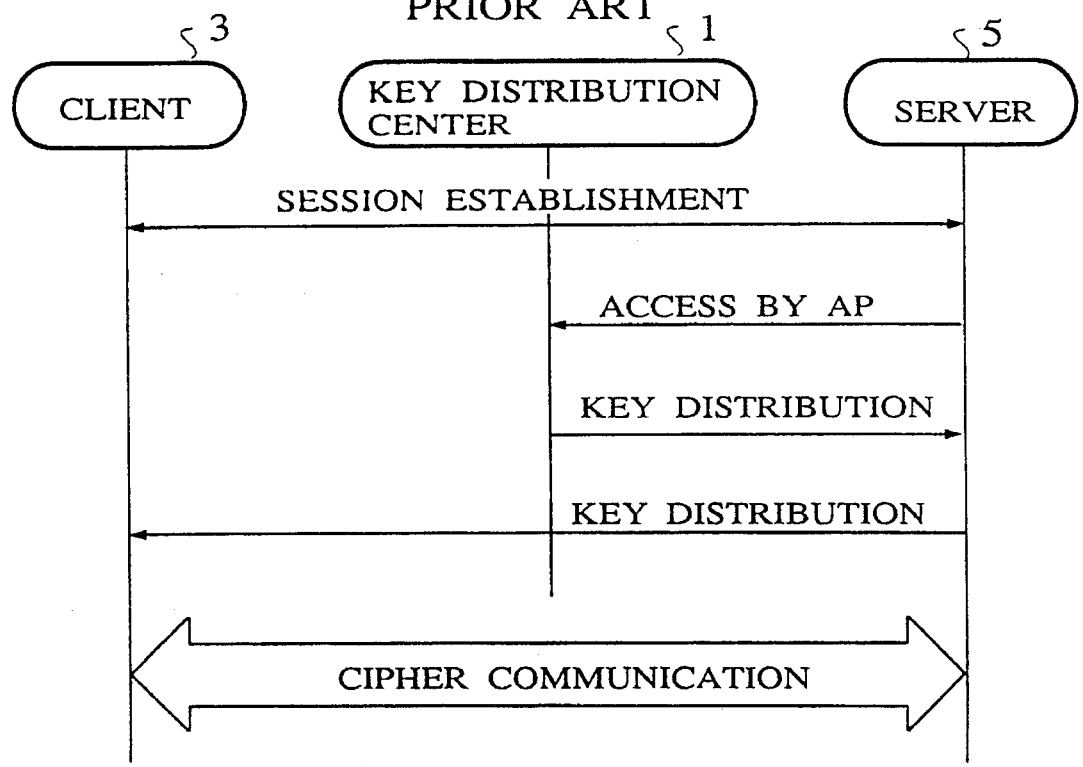

Referring now to FIG. 3, the first embodiment of the cipher communication system according to the present invention will be described in detail. Here, an exemplary case of a TCP/IP (Transmission Control Protocol/Internet Protocol) LAN which carries out the communication by using the connection oriented protocol will be described.

In this first embodiment, the cipher communication system has a configuration as shown in FIG. 3, which generally comprises a key distribution center 1 and a plurality of terminals (#1 to #n) 3 which are mutually connected through a network 2. Here, the key distribution center 1 generates the session keys and transmits the generated session keys to the terminals 3 through the network 2 while connections (sessions) among the terminals 3 are established through the network 2.

The key distribution center 1 includes: a connection control unit 11 for establishing a connection with each terminal 3; a reception unit 12 for receiving a terminal identification from each terminal 3; a transmission unit 13 for transmitting a session key to each terminal 3; a random number generation unit 14 for generating the session keys by generating random numbers; a key management unit 15 for searching a database for or generating a master key for each terminal 3; and an enciphering unit 16 for enciphering the session key generated by the random number generation unit 14 by using the master key obtained by the key management unit 15.

On the other hand, each terminal 3 includes: a connection request detection unit 31 for detecting a connection request from an application program (communication module); a connection control unit 32 for establishing a connection with the key distribution center 1 and a connection with the other terminal 3; a transmission unit 33 for transmitting the terminal identifications of its own terminal 3 and the other terminal 3, while transmitting the enciphered communication data (cipher text) to the other terminal 3; a reception unit 34 for receiving the session key from the key distribution center 1, while receiving the cipher text from the other terminal 3; a key management unit 35 for managing the master key of its own terminal 3 and the session key from the key distribution center 1; and an enciphering/deciphering unit 36 for deciphering the session key by using the master key, while deciphering the cipher text into an original communication data (plain text) or enciphering the plain text Into the cipher text at a time of communication with the other terminal 3.

In the other terminal 3 which receives the session key from this terminal 3 will decipher this session key by using its own master key and store the deciphered session key in its key management unit 35 as a session key for the cipher communication with this terminal 3.

Figure 4:
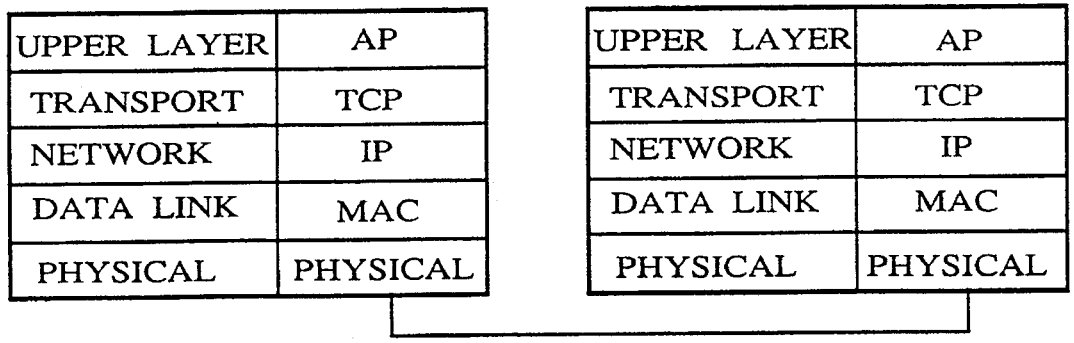
FIG. 4 is a diagram of a communication protocol used in the system of FIG. 3.

FIG. 4 shows the protocol used in the TCP/IP LAN in accordance with the reference model of the OSI (Open Systems Interconnect), where the data link layer is realized by the MAC (Media Access Control) protocol, the network layer is realized by the IP, the transport layer is realized by the TCP, and the application programs (AP) establishes a connection at the TCP layers.

Figure 5:
FIG. 5 is a diagram of a frame format used in the system of FIG. 3.

FIG. 5 shows a frame format used in the communication between two terminals connected to the TCP/IP LAN, where each frame comprising a header portion including an MAC header (MAC_H), an IP header (IP_H), and a TCP header (TCP_H), a data portion containing data of the AP, and a frame check sequence (FCS) for the entire frame. The cipher communication using the network through the IP routers can be realized by enciphering the data portion. Here, different session keys are used for different connections in order to prevent the illegal monitoring or falsification of the communication data by the maliciously deceptive terminal. Here, the connection with a communication target terminal is uniquely determined by the IP address of the IP layer (defined In the IP header) and the port number of the TCP layer (defined In the TCP header) of the sender side as well as the IP address and the port number of the receiver side.

Figure 6A:
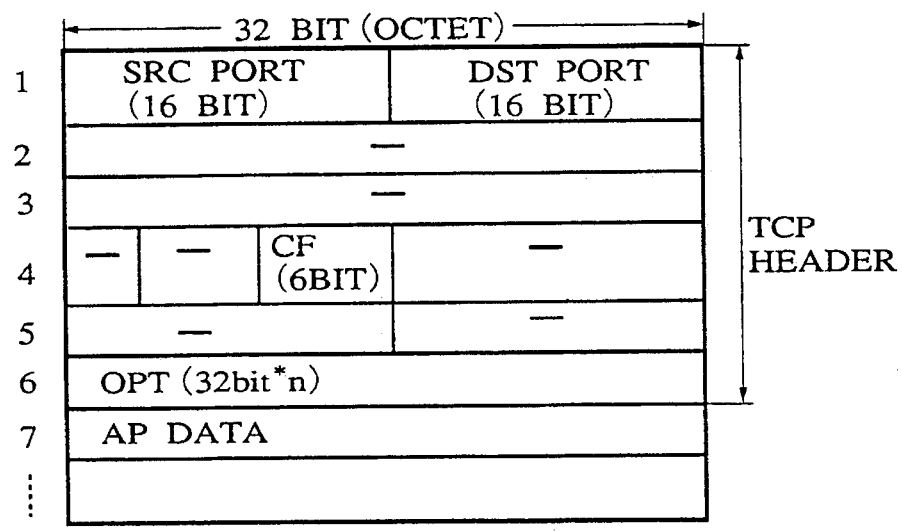
FIG. 6A is a diagram of a TCP header format used in the system of FIG. 3.
Figure 6B:
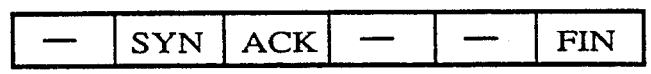
FIG. 6B is a diagram of a CF field in the TCP header format of FIG. 6A.

FIG. 6A shows a header format of the TCP layer, where a 16 bit source port (SRC_PORT) and a 16 bit destination port (DST_PORT) Indicating a source port number and a destination port number, respectively, and a 6 bit control flag (CF) of the TCP header used in establishing or closing the connection with the communication target terminal, as well as the option data field (OPT). Here, the CF field is as shown in FIG. 6B, in which the establishing and the closing of the connection is realized by the 3-way hand shaking using "SYN" and "ACK" flags at a time of establishing and "FIN" and "ACK" flags at a time of closing. For the detail of the connection establishing/closing procedure, see "Transmission Control Protocol" RFC793 (1981).

Figure 7A:
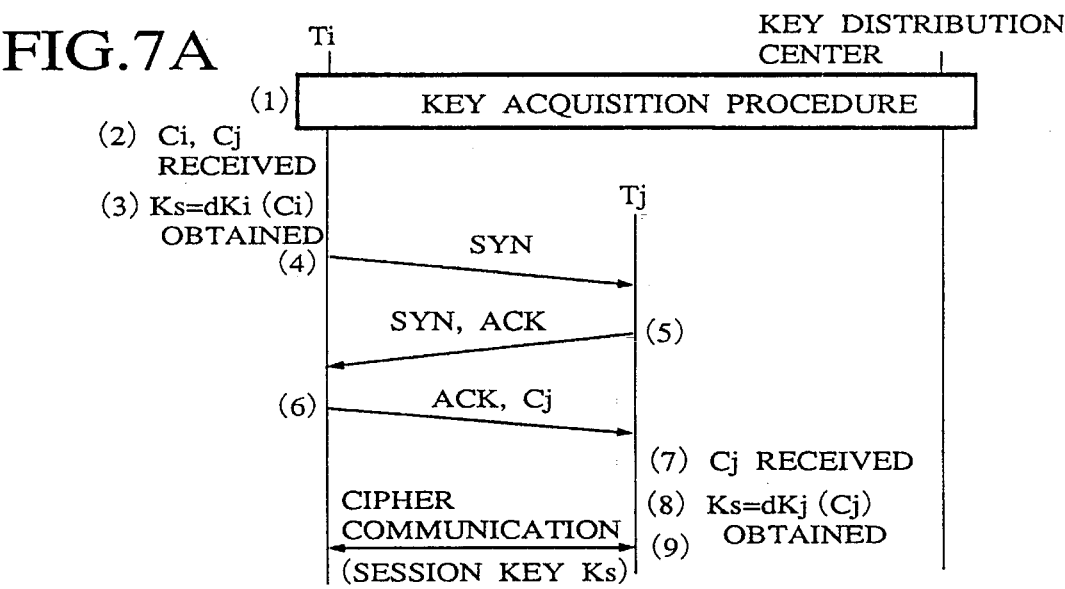
FIGS. 7A, 7B, and 7C are sequence charts for the procedures of the cipher communication in the system of FIG. 3.
Figure 7B:
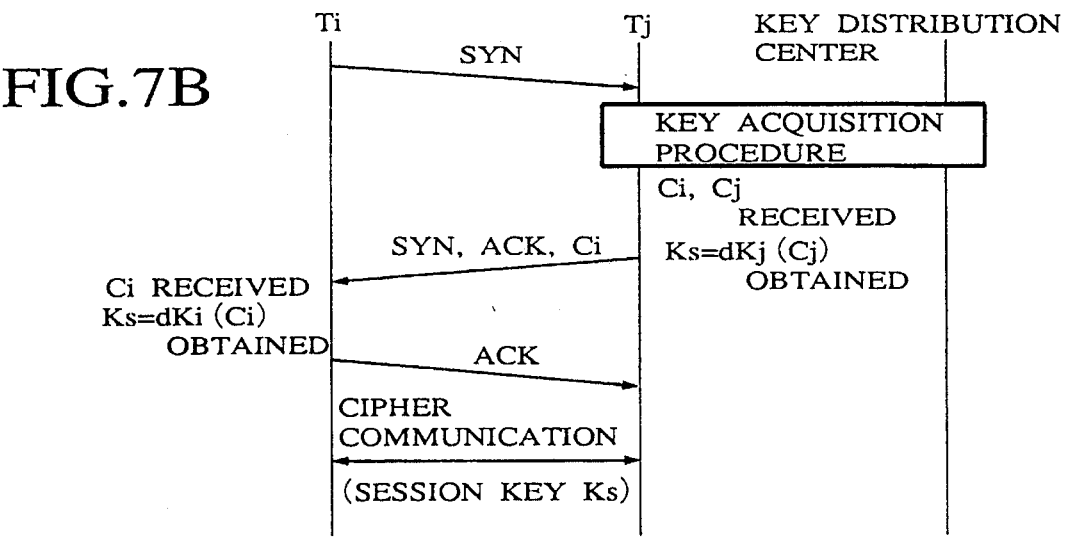
Figure 7C:
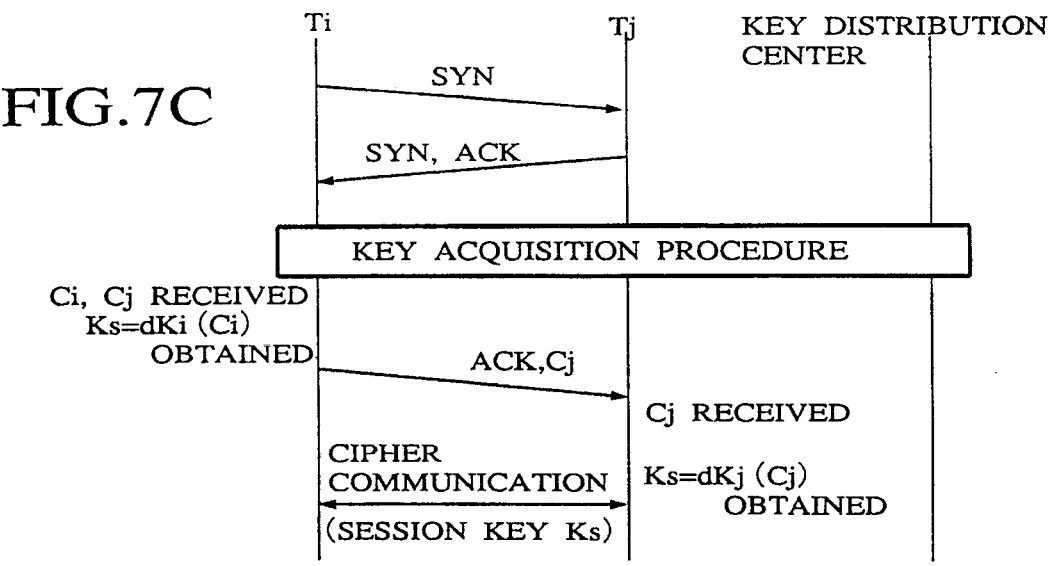

In this first embodiment, the session key is distributed from the key distribution center 1 to each terminal 3 according to any one of the sequence charts of FIGS. 7A to 7C, depending on timing for making an access to the key distribution center 1. Here, the master keys Ki and Kj of the sender side terminal Ti and the receiver side terminal Tj are given in advance to the respective terminals at a time of the installment of the terminals and hidden from the outside of each terminal. In a case of FIG. 7A, the key distribution operation proceeds as follows.

[1] When the terminal Ti detects the connection request from the application program, the access to the key distribution center 1 is made to carry out the key acquisition procedure described below (1), and the enciphered session keys Ci and Cj which are enciphered by the respective master keys of the terminals Ti and tj, respectively, are received from the key distribution center 1 (2).

[2] The terminal Ti deciphers the enciphered session key Ci by using the master key Ki to obtain the session key Ks=dKi(Ci) (3). This session key Ks is kept at the terminal Ti until the connection with the terminal Tj is closed.

[3] The terminal Ti makes a connection request to the terminal Tj by the "SYN" flag (4).

[4] The terminal Tj returns the response and the connection request by the "ACK" and "SYN" flags (5).

[5] The terminal Ti transmits the enciphered session key Cj received from the key distribution center 1 along with the "ACK" flag (6).

[6] The terminal T3 receives the enciphered session key Cj from the terminal Ti (7).

[7] The terminal Tj deciphers the enciphered session key Cj by using the master key Kj to obtain the session key Ks=dKj(Cj) (8). This session key Ks is kept at the terminal Tj until the connection with the terminal Ti is closed.

[8] Thereafter, the cipher communication between the terminals Ti and Tj is carried out by using the common session key Ks (9).

The cases of FIGS. 7B and 7C differs from the above described case of FIG. 7A only in the timing for carrying out the key acquisition procedure, such that a case of FIG. 7B requires the key acquisition procedure between the terminal Tj and the key distribution center 1 after the "SYN" flag is transmitted from the terminal Ti to the terminal Tj, while a case of FIG. 7C requires the key acquisition procedure between the terminal Ti and the key distribution center 1 after the "SYN" and "ACK" flags are transmitted from the terminal Tj to the terminal Ti. The rest of the operations of FIGS. 7B and 7C are substantially equivalent to that of FIG. 7A.

The key acquisition procedure for making an access from the terminal Ti (or Tj) to the key distribution center 1 and obtaining the session key Ks In the key distribution operations of FIGS. 7A to 7C is carried out according to the sequence chart of FIG. 8 as follows.

[1] The terminal Ti makes a connection request to the key distribution center 1 by the "SYN" flag (1).

[2] The key distribution center 1 returns the response and the connection request to the terminal Ti by the "ACK" and "SYN" flags. (2).

[3] The terminal Ti returns the "ACK" flag to the key distribution center 1 so as to establish the connection between the terminal Ti and the key distribution center 1 (3).

[4] The terminal Ti transmits the terminal identifications IDi and IDj of the terminals Ti and Tj to the key distribution center 1 (4). Here, each terminal identification IDi or IDj is given as either the IP address or the MAC address.

[5] The key distribution center 1 generates the random number to generate the session key Ks, and searches out or generates the master keys Ki and Kj of the terminals Ti and Tj according to the terminal identifications IDi and IDj.

Here, the method for searching or generating the master keys Ki and Kj is inessential to the present invention, and any suitable method may be used. It should be obvious that, in a case of obtaining the master keys Ki and Kj by the search, there is a need to register the master key and the terminal Identification of each terminal in the database of the key distribution center 1 in advance. The generation of the master keys Ki and Kj can be realized by the known method such as that disclosed in K. Tanaka, I. Oyalzu, "A Confidentiality System for ISDN inter-PC High-Speed File Transfer", IEEE INFOCOM '94 proceedings, Vol. 3, pp. 1270–1277 (1994).

Then, the key distribution center 1 generates the enciphered session keys Ci=eKi(Ks) and Cj=eKj(Ks) by enciphering the obtained session key Ks by the obtained master keys Ki and Kj, respectively (5).

[6] The key distribution center 1 transmits the enciphered session keys Ci and Cj to the terminal Ti (6).

[7] The terminal Ti makes a connection closing request to the key distribution center 1 by the "FIN" flag (7).

[8] The key distribution center returns the response to the terminal Ti by the "ACK" flag (8).

[9] The key distribution center 1 makes a connection closing request to the key distribution center 1 by the "FIN" flag (9).

[10] The terminal Ti returns the response to the key distribution center 1 by the "ACK" flag, so as to close the connection between the terminal Ti and the key distribution center 1 (10).

It is to be noted that, in the procedure of FIG. 8, the terminal identifications IDi and IDj transmitted at [4] may be transmitted along the "SYN" flag at [1] and the enciphered session keys Ci and Cj transmitted at [6] may be transmitted along the "SYN" and "ACK" flags at [2] instead, such that steps [4] and [6] can be omitted.

It is also to be noted that the key distribution algorithm is not necessarily limited to that described above. For example, by changing the transmitted data content (such as IDi, IDj, Ci, and Cj In the above), it is possible to make an authentication of the target terminal in the known manner. See. K. Tanaka. I. Oyalzu. "A Confidentiality System for ISDN inter-PC High-Speed File Transfer", IEEE INFOCOM '94 proceedings. Vol. 3. pp. 1270–1277 (1994).

Thus, according to this first embodiment, it is possible to provide a cipher communication system and scheme capable of realizing the cipher communication without affecting the already existing application programs and hardware, as the cipher communication is realized by obtaining the session key at a timing of the request for establishing the session for the cipher communication between the terminals, and by using the session key obtained by making an access to the key distribution center according to the application program executed on the terminal and sharing the common session key among the terminals to communicate with each other by transmitting the session key from one terminal to the other terminal during the connection establishing procedure.

Figure 9:
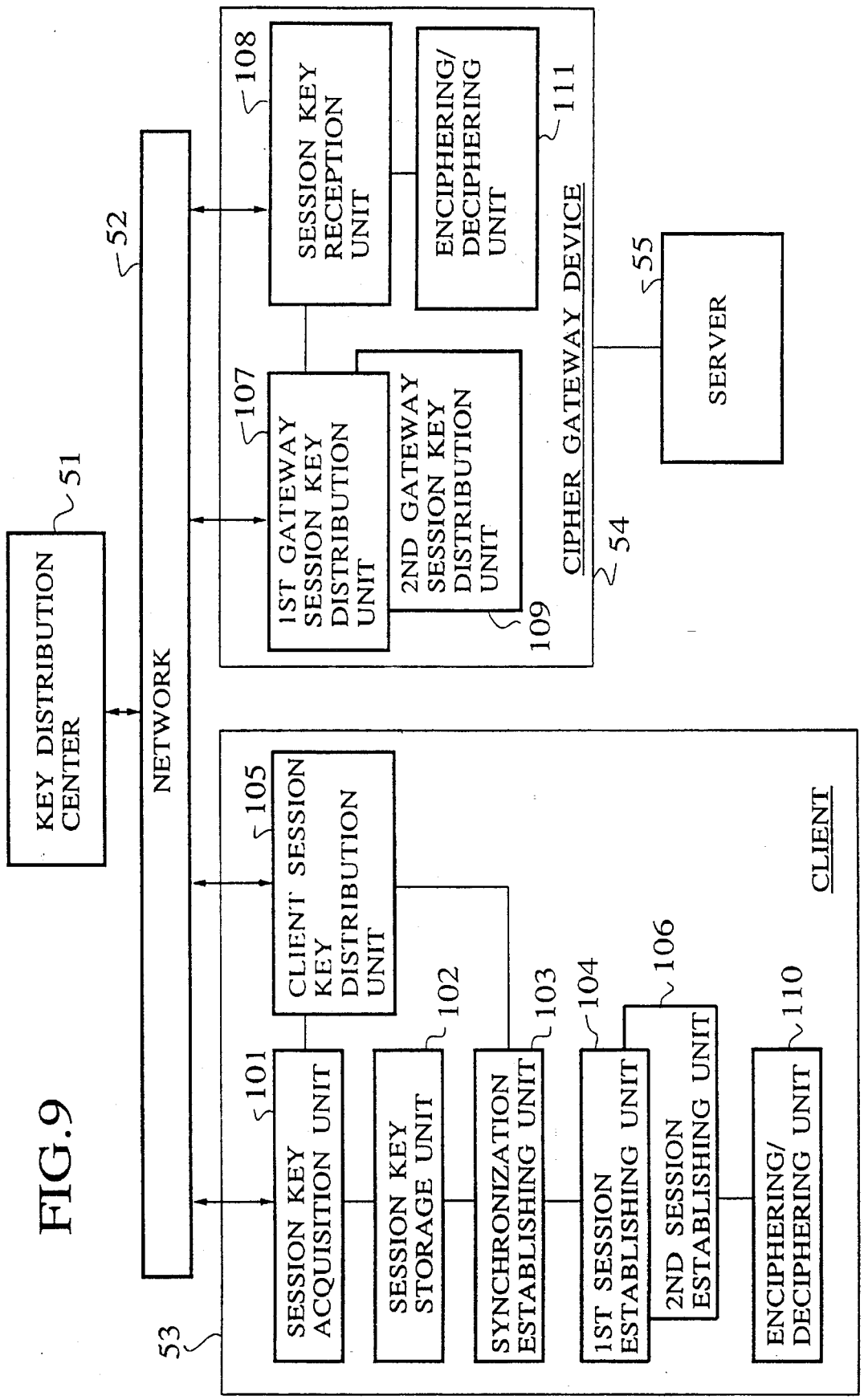
FIG. 9 is a block diagram of a second embodiment of a cipher communication system according to the present invention.

Referring now to FIG. 9, the second embodiment of the cipher communication system according to the present invention will be described in detail.

In this second embodiment, the cipher communication system has a configuration as shown in FIG. 9, which generally comprises a key distribution center 51 and at least one client 53 (only one is shown in FIG. 9) 1s mutually connected through a network 52. In addition, at least one server 55 (only one is shown in FIG. 9) is also connected with the network 52 through at least one cipher gateway device 54 (only one is shown in FIG. 9). Here, the key distribution center 51 generates the session key and transmits the generated session key to the client 53 and the cipher gateway device 54 through the network 52 while session between the client 53 and the server 55 is established through the network 52 and the cipher gateway device 54.

The cipher gateway device 54 located between the server 55 and the network 52 includes a first gateway session key distribution unit 107 for receiving the cipher communication request outputted from the client 53 before the communication session is established between the client 53 and the server 55, obtains the session key from the key distribution center 1, and transmits the obtained session key to the client 53, and an enciphering/deciphering unit 111 for enciphering or deciphering the packet by the session key obtained by the first gateway session key distribution unit 107.

The client 53 includes a session key acquisition unit 101 for requesting a cipher communication to the cipher gateway device 54 before the communication session with the server 55 is established, a session key storage unit 102 for storing the session key obtained by the session key acquisition unit 101, a synchronization establishing unit 103 for establishing a cipher synchronization with the cipher gateway device 54, a first session establishing unit 104 for establishing the session with the server 55 at a timing of the synchronization established by the synchronization establishing unit 103, and an enciphering/deciphering unit 110 for enciphering or deciphering the packet after the session establishment.

Here, prior to the establishment of the session between the client 53 and the server 55, in response to the cipher communication request from the client 53, the session key to be used in that session is obtained from the key distribution center 51 and distributed to the client 58 by the cipher gateway device 54, so as to share the common session key between the client 53 and the cipher gateway device 54.

In addition, the client 53 further includes the client session key distribution unit 105 for obtaining the session key from the key distribution center 51 through the network 52 before the communication session with the server 55 is established, and distributing the obtained session key to the cipher gateway device 54, while the cipher gateway device 54 further includes a session key reception unit 108 for receiving the cipher communication request from the client 53 as well as the session key distributed from the client session key distribution unit 105.

Moreover, the client 53 further includes a second session establishing unit 106 for establishing a session with a specific port of the cipher gateway device 54 in order to request the cipher communication to the cipher gateway device 54 before the communication session with the server 55 is established, while the cipher gateway device 54 further includes a second gateway session key distribution unit 109 for obtaining the session key from the key distribution center 51 and distributing the obtained session key to the client 53 at a timing of the session from the client 53 to the specific port established by the second session establishing unit 106.

Here, the client 53 can make a connection request for a specific port number of the cipher gateway device 54 by specifying that specific port number, in response to which the cipher gateway device 54 can establish the session with the key distribution center 51. In such a case, it is possible for the client 53 to be provided with a table registering the terminal identification of each terminal in correspondence to the specific port number for each terminal identified by the terminal identification as shown in FIG. 21, according to which the specific port number to be specified can be obtained.

Figure 10:
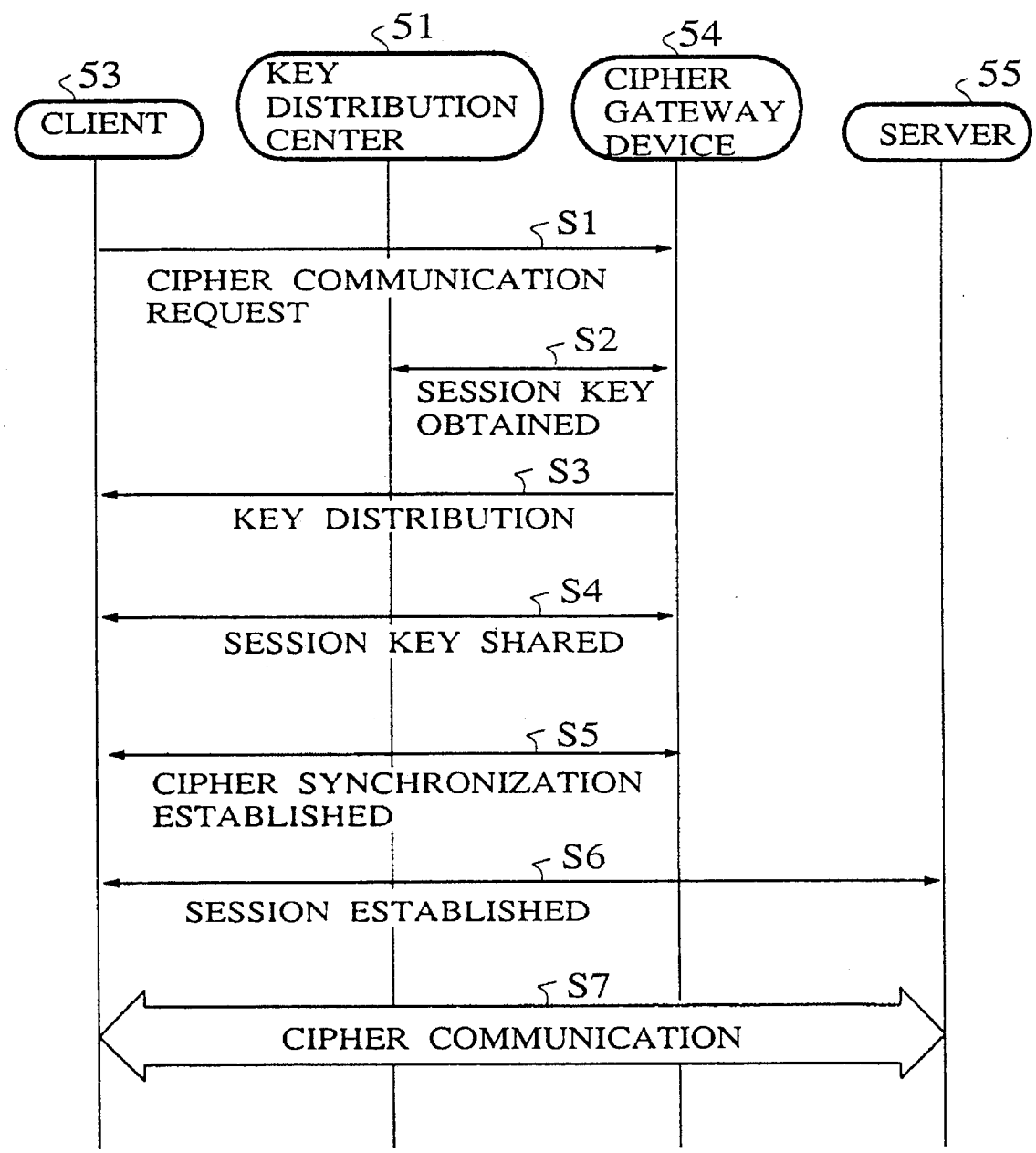
FIG. 10 is a sequence chart for the procedure of the cipher communication in the system of FIG. 9.

This cipher communication system of FIG. 9 operates according to the sequence chart of FIG. 10 as follows. Namely, prior to the establishment of the session between the client 53 and the server 55, the client 53 makes the cipher communication request, (step S1), and in response, the session key to be used in that session is obtained from the key distribution center 51 by the cipher gateway device 54 (step S2), and distributed to the client 53 by the cipher gateway device 54 (step S3), so as to share the common session key between the client 53 and the cipher gateway device 54 (step S4). The client 53 then establishes the cipher synchronization with the cipher gateway device 54 (step S5) such that the session with the server 55 is established at a timing of the cipher synchronization establishment (step S6). Thereafter, the cipher communication between the client 53 and the cipher gateway device 54 can be carried out (step S7) until the session between the client 53 and the server 55 is closed.

Here, in order to share the common session key between the client 53 and the cipher gateway device 54, the client 53 may obtain the session key from the key distribution center 51 at the step S2 and distribute the obtained session key to the cipher gateway device 54 at the step S3 instead.

Thus, in this second embodiment, the cipher gateway device is connected as a front-end processor of the server 55, and the access to the key distribution center 51 is made by this cipher gateway device 54 at a timing of the cipher communication request from the client 53, such that the session key is obtained and distributed to the communication target client 53 so as to share the common session key, so that It is possible to provide a cipher communication system and scheme capable of realizing the cipher communication without affecting the already existing application programs and hardware.

Now, this second embodiment of the cipher communication system according to the present invention will be described in further detail for an exemplary case of a TCP/IP LAN which cattles out the communication through the packet exchange network by using the connection oriented protocol.

Figure 11:
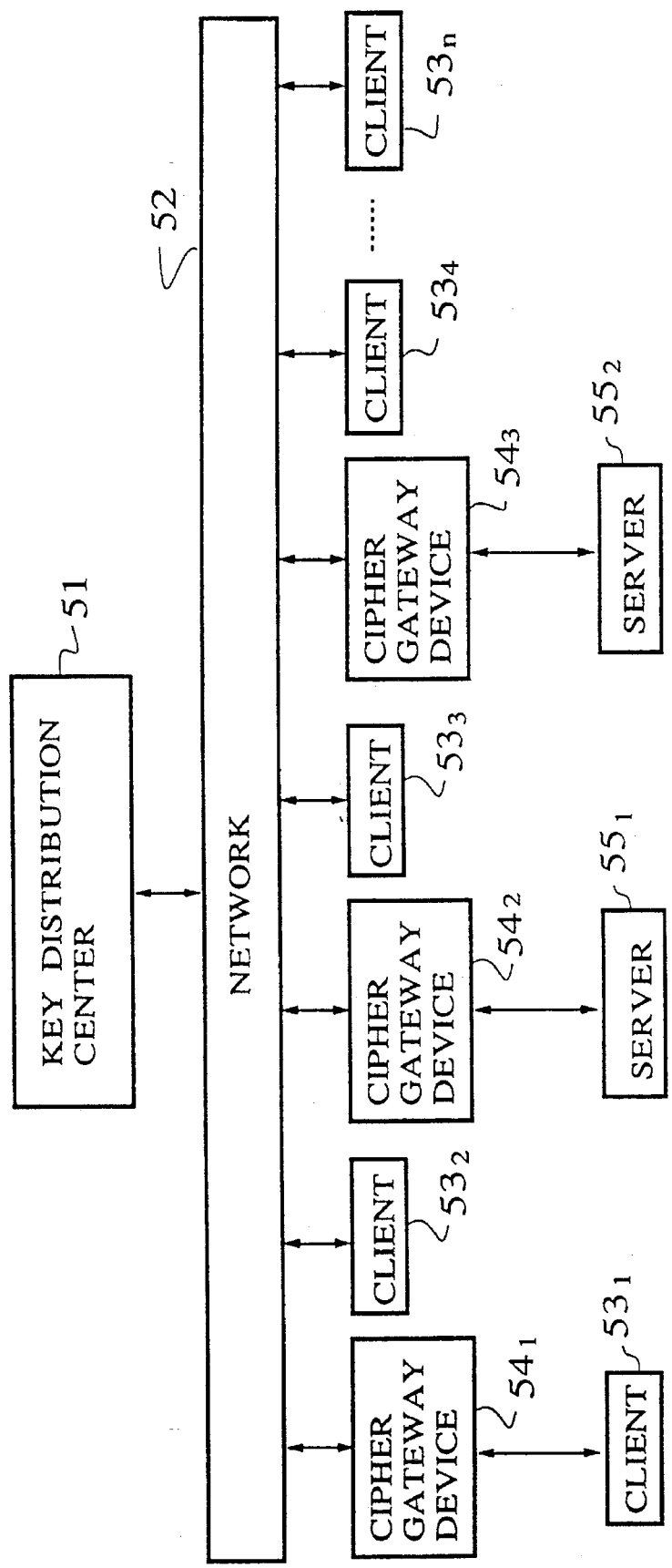
FIG. 11 is a block diagram of the second embodiment of the cipher communication system according to the present invention for an exemplary case of a TCP/IP LAN.

In this case, the system has an overall configuration as shown in FIG. 11. which comprises the key distribution center 51 and a plurality of clients 53 ($53_i$ to $53_n$) are mutually connected through the network 52, and a plurality of servers 55 ($55_1$ and $55_2$) are also connected with the network 52 through a plurality of cipher gateway devices 54 ($54_1$ to $54_3$). Here, any of the clients 53 (such as $53_1$) may also be connected with the network 52 through the cipher gateway device 54 (such as $54_1$) if desired.

Figure 12:
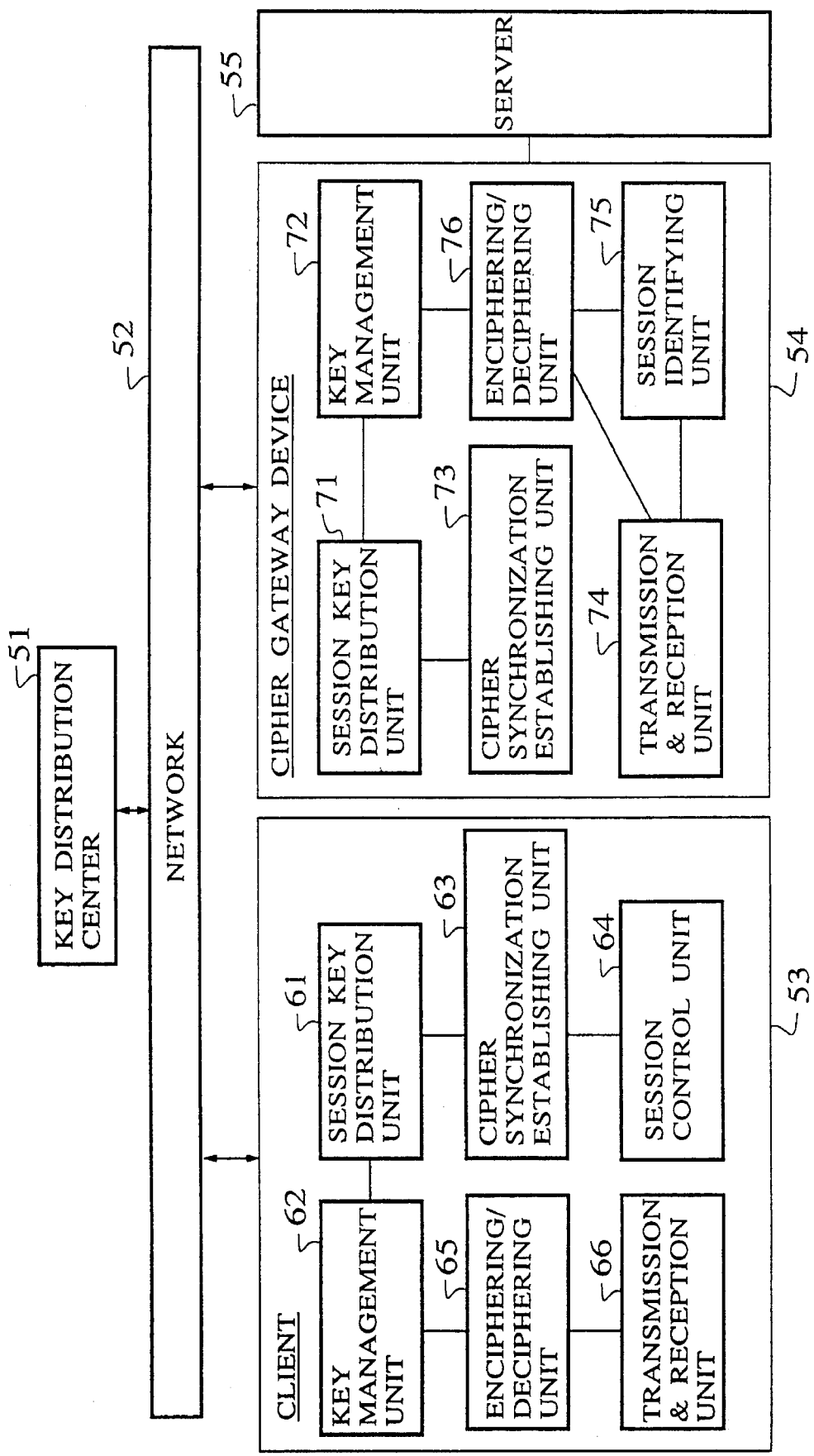
FIG. 12 is a detailed block diagram of a client and a cipher gateway device in the system of FIG. 11.

More specifically, each client 53 and each cipher gateway device 54 are connected with the key distribution center 51, the network 52, and the server 55 in a configuration as shown In FIG. 12.

Here, the key distribution center 51 generates the session key, and transmits the generated session key to the cipher gateway device 54. The network 52 establishes the sessions and carries out the communications between the client 53 and the server 55, between the key distribution center 51 and the cipher gateway device 54, and between the client 53 and the cipher gateway device 54. The client 53 and the server 55 communicates with each other by exchanging the packets, while the cipher gateway device 54 enciphers or deciphers the packets exchanged between the client 53 and the server 55.

The client 53 includes: a session key distribution unit 61 for making the cipher communication request to the cipher gateway device 54, and obtaining the session key from the cipher gateway device 54; a key management unit 62 for managing the session key received from the session key distribution unit 61 for each session; a cipher synchronization establishing unit 63 for establishing a synchronization for the cipher communication between the client 53 and the cipher gateway device 54, a session control unit 64 for receiving the cipher synchronization establishment complete signal from the cipher synchronization establishing unit 63 and establishing the session with the server 55; an enciphering/deciphering unit 65 for enciphering the data received from application program (AP) and deciphering the enciphered packets received from the server 55; and a transmission and reception unit 66 for transmitting and receiving the enciphered packets to and from the network 52.

The cipher gateway device 54 Includes: a session key distribution unit 71 for receiving the cipher communication request from the client 53, obtaining the session key from the key distribution center 51, and distributing the obtained session key to the client 53; a key management unit 72 for managing the session key received from the session key distribution unit 71 for each session; a cipher synchronization establishing unit 73 for establishing a synchronization for the cipher communication between the client 53 and the cipher gateway device 54; a transmission and reception unit 74 for transmitting and receiving the packets to and from the client 53 or the server 55; a session identifying unit 75 for extracting the source IP address, the source port number, the destination IP address, and the destination port number from the IP header and the TCP header of the packet received from the transmission and reception unit 74 and obtaining the session number for identifying each session; and an enciphering/deciphering unit 76 for obtaining the session key from the key management unit 72 by using the session number obtained by the session identifying unit 75, and deciphering the packet when it is a packet destined to the server 55 from the client 53, or enciphering the packet when it is a packet destined to the client 53 from the server 55.

This second embodiment uses the protocol similar to that of FIG. 4 described above, the packet format similar to the frame format of FIG. 5 described above, and the TCP header format similar to that of FIG. 6A described above.

In this configuration of FIG. 12, the cipher communication can be requested from the client 53 to the cipher gateway device 54 by any one of the following three schemes.

(1) The establishment of the session with respect to the specific port number of the cipher gateway device 54.

(2) The transmission of the message (cipher communication request) by utilizing the option field.

(3) The transmission of the message (cipher communication request) by utilizing the application program data.

In this second embodiment, the key distribution operation is carried out according to the sequence chart of FIG. 13 as follows. Here, the master keys Kcl and Kgw of the client 53 and the cipher gateway device 54 are given in advance to the respective elements at a time of the installment of these elements and hidden from the outside of each element.

[1] The client 53 establishes the session with the cipher gateway device 54 prior to the establishment of the session with the server 55 (step S101), and makes the cipher communication request to the cipher gateway device 54 by transmitting the client's identification IDcl (step S102).

Here, the client 53 can make a connection request for a specific port number of the cipher gateway device 54 by specifying that specific port number according to the table of FIG. 21 described above, such that the cipher gateway device 54 can establish the session with the key distribution center 51 in response.

[2] When the cipher communication request from the client 53 is detected, the cipher gateway device 54 makes an access to the key distribution center 51 and carries out the key acquisition procedure to be described below (step S103) and receives the enciphered session keys Ccl and Cgw which are enciphered by the master keys Kcl and the Kgw of the client 53 and the cipher gateway device 54. respectively, from the key distribution center 51 (step S104).

[3] The cipher gateway device 54 then deciphers the enciphered session key Cgw by using its own master key Kgw to obtain the session key Ks=dKgw(Cgw) (step S105). This session key Ks is kept at the cipher gateway device 54 until the session between the client 53 and the server 55 is closed.

At this point, the client 53 may also transmit the data for mapping the session key to be used in the cipher communication and the communication connection (session). In a case the TCP/IP is used as the connection oriented communication protocol, the data for mapping may be given by the IP addresses and the port numbers of the client 53 and the server 55.

[4] The cipher gateway device 54 transmits the enciphered session key Ccl received from the key distribution center 51 to the client 53 (step S106).

[5] The client 53 receives the enciphered session key Ccl from the cipher gateway device 54 (step S107).

[6] The client 53 then deciphers the enciphered session key Ccl by using its own master key Kcl to obtain the session key Ks=dKcl(Ccl) (step S108). In this manner the client 53 and the cipher gateway device 54 share the common session key Ks. This session key Ks is kept at the client 53 until the session with the server 55 is closed.

[7] The cipher synchronization establishing unit 63 and 73 establish the cipher synchronization between the client 53 and the cipher gateway device 54 (step S109). When the cipher synchronization establishment is completed, the client 53 closes the session with the cipher gateway device 54. (step S110). Here, the scheme for establishing the cipher synchronization is inessential to the present invention and any suitable scheme may be used.

[8] The session between the client 53 and the server 55 is established (step S111).

[9] Thereafter, the cipher communication between the client 53 and the cipher gateway device 54 is carried out by using the common session key Ks (step S112).

[10] The cipher gateway device 54 receives the packet destined to the server 55 from the client 53, and deciphers the packet by using the common session key Ks (step S113). Then, this deciphered packet (plain text packet) is transmitted to the server 55 to carry out the non-cipher communication between the cipher gateway device 54 and the server 55 (step S114).

Alternatively, the cipher gateway device 54 receives the packet destined to the client 53 from the server 55 by the non-cipher communication (step S112'), and enciphers the packet by using the common session key Ks (step S113'). Then, this enciphered packet (cipher text packet) is transmitted to the client 53 to carry out the cipher communication between the cipher gateway device 54 and the client 53 (step S114').

Figure 13:
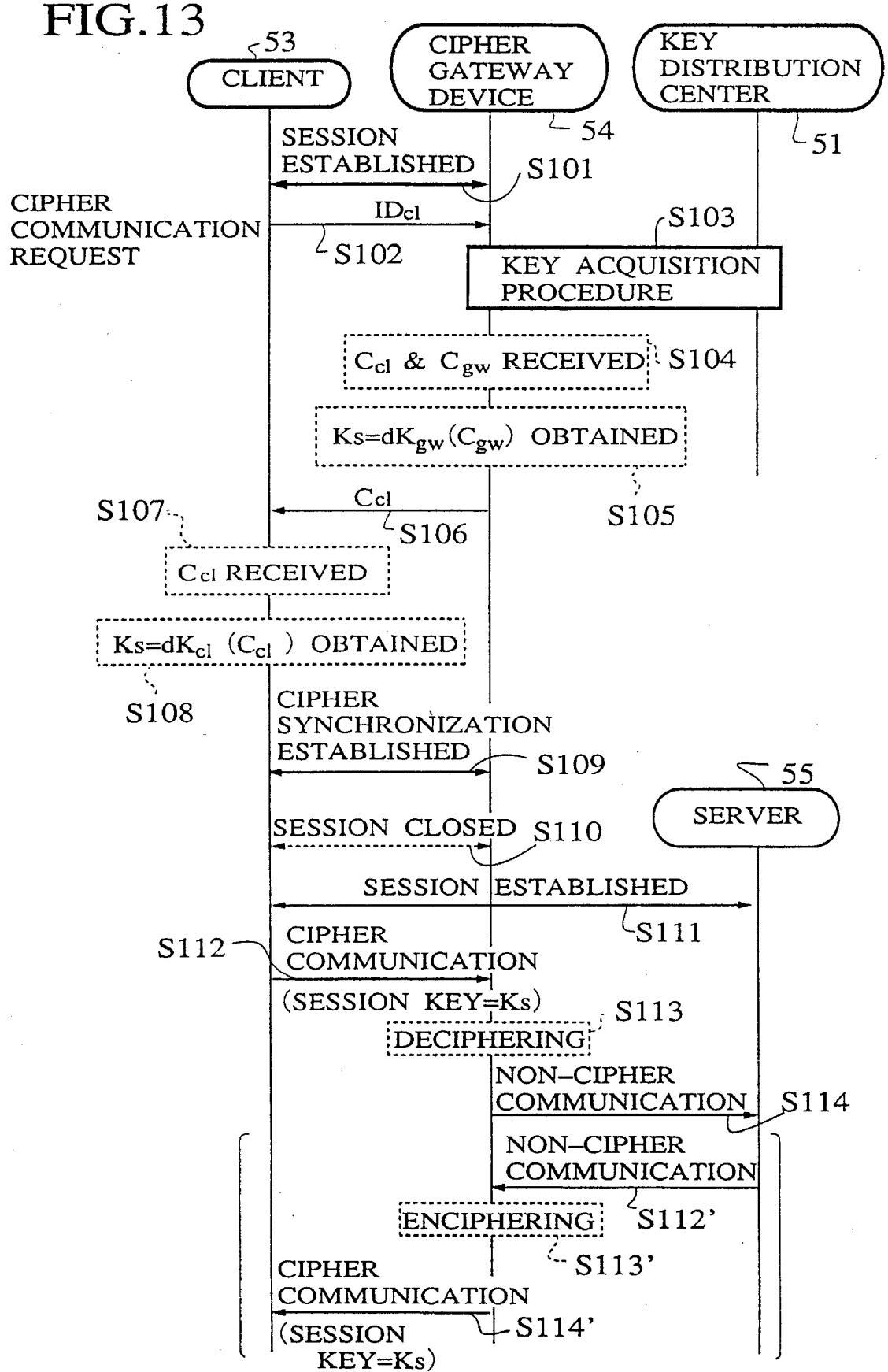
FIG. 13 is a sequence chart for the procedure of the cipher communication in the system of FIG. 11.

The key acquisition procedure at the step S103 in the key distribution operations of FIG. 13 is carried out according to the sequence chart of FIG. 14 as follows.

[1] The session key distribution unit 71 of the cipher gateway device 54 makes an access to the key distribution center 51 to establish the session (step S201).

[2] The cipher gateway device 54 transmits the identifications IDcl and IDgw of the client 53 and the cipher gateway device 54 to the key distribution center 51 (step S202). Here, the Identifications IDcl and IDgw are given by either the IP address or the MAC address used for identifying each element.

[3] The key distribution center 51 generates the random number to generate the session key Ks, and searches out or generates the master keys Kcl and Kgw of the client 53 and the cipher gateway device 54 according to the identifications IDcl and IDgw. Here, the method for searching or generating the master keys Kcl and Kgw is inessential to the present invention, and any suitable method may be used. It should be obvious that, in a case of obtaining the master keys Kcl and Kgw by the search, there is a need to register the master key and the identification of each element in the database of the key distribution center 51 in advance. The generation of the master keys Kcl and Kgw can be realized by the known method. See, K. Tanaka, I. Oyalzu, "A Confidentiality System for ISDN Inter-PC High-Speed File Transfer", IEEE INFOCOM '94 proceedings, Vol. 3, pp. 1270–1277 (1994).

Then, the key distribution center 51 generates the enciphered session keys Ccl=eKcl(Ks) and Cgw=eKgw(Ks) by enciphering the obtained session key Ks by the obtained master keys Kcl and Kgw, respectively (step S203).

[4] The key distribution center 51 transmits the enciphered session keys Ccl and Cgw to the cipher gateway device 54 (step S204).

[5] When the key management unit 72 of the cipher gateway device 54 receives the enciphered session keys Ccl and Cgw, the session with the key distribution center 51 is closed (step S205).

Figure 14:
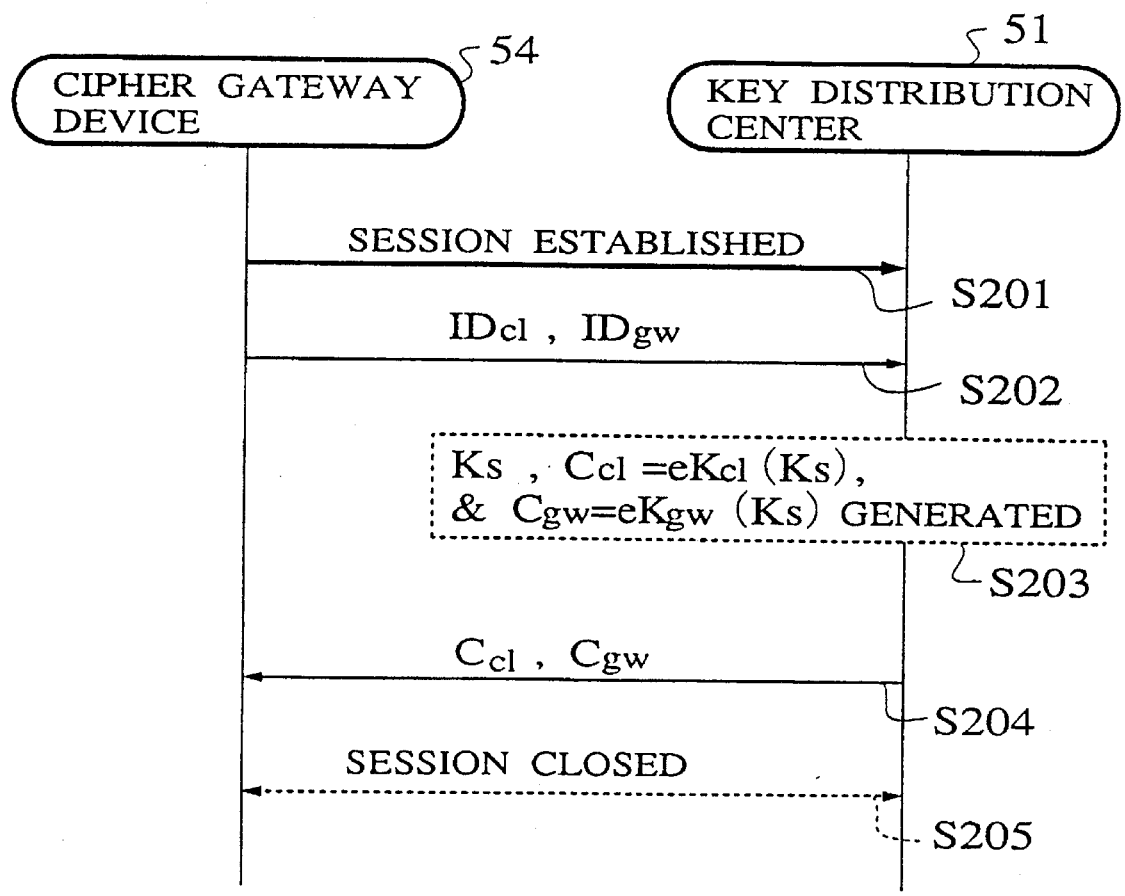
FIG. 14 is a sequence chart for a key acquisition procedure in the sequence chart of FIG. 13.

It is to be noted that, in the procedure of FIG. 14, a case of carrying out the communication by establishing the session between the cipher gateway device 54 and the key distribution center 51 has been described, but it is also possible to use the connectionless communication using the UDP (User Datagram Protocol), or any other suitable communication scheme.

It is also to be noted that the key distribution algorithm is not necessarily limited to that described above. For example, by changing the transmitted data content (such as IDcl, IDgw, Ccl, and Cgw in the above), it is possible to make an authentication of the target terminal in the known manner. See, K. Tanaka, I. Oyalzu, "A Confidentiality System for ISDN inter-PC High-Speed File Transfer", IEEE INFOCOM '94 proceedings, Vol. 3, pp. 1270–1277 (1994).

It ls further to be noted that a case of obtaining the session key from the key distribution center 51 by the cipher gateway device 54 has been described above, but It is also possible for the client 53 to obtain the session key from the key distribution center 51 and transmits the obtained session key to the cipher gateway device 54 in the similar manner. In such a case, it suffices to simply replace the cipher gateway device 54 in FIG. 14 by the client 53.

Thus, according to this second embodiment, the cipher communication between the client 53 and the server 55 through the network 52 is realized by first connecting the cipher gateway device 54 between the network 52 and the server 55, such that, prior to the establishment of the session between the client 53 and the server 55, the session key is obtained from the key distribution center 51 by the cipher gateway device 54 in response to the cipher communication request from the client 53, and the obtained session key is distributed to the client 53 so that the common session key is shared by the client 53 and the cipher gateway device 54, and then establishing the session between the client 53 and the server 55 at a timing of the cipher synchronization between the client 53 and the cipher gateway 54. Here, the communication between the cipher gateway device 54 and the server 55 can be the non-cipher (plain text) communication. Consequently, it is possible to provide a cipher communication system and scheme capable of realizing the cipher communication without affecting the already existing application programs and hardware.

Figure 15:
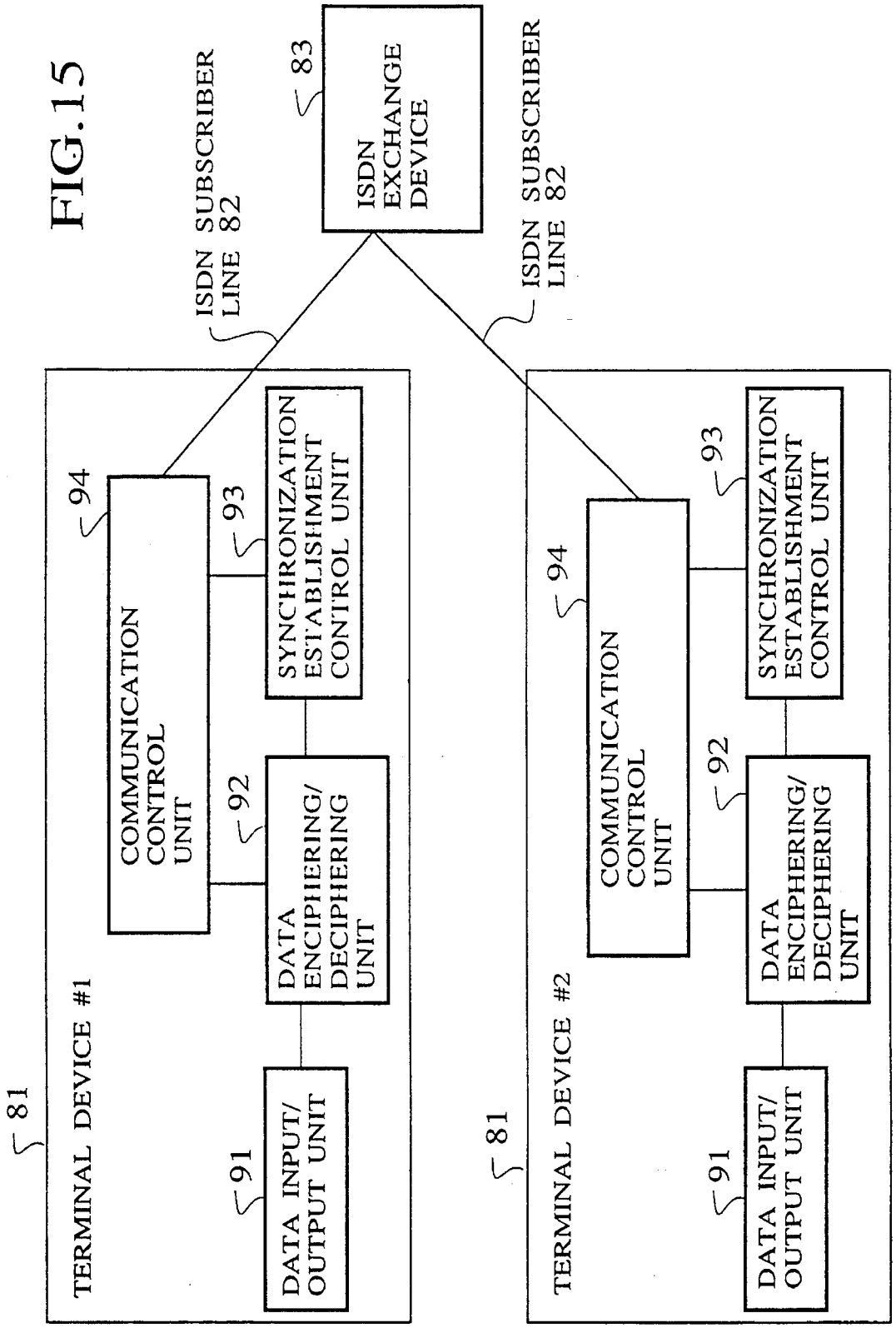
FIG. 15 is a block diagram of a third embodiment of a cipher communication system according to the present invention.

Referring now to FIG. 15, the third embodiment of the cipher communication system according to the present invention concerning the establishment of the synchronization for the start/end of the cipher communication will be described in detail. Here, an exemplary case of using the ISDN as the digital transmission path will be described, but this third embodiment is equally applicable to any other digital transmission path other than the ISDN.

In this third embodiment, the cipher communication system has a configuration as shown in FIG. 15, which generally comprises a plurality of terminal devices (#1 and #2) 81 connected with respective ISDN subscriber lines 82, and an ISDN exchange device 83 connected with all the ISDN subscriber lines 82. Each terminal device 81 includes a data input/output unit 91, a data enciphering/deciphering unit 92, a synchronization establishment control unit 93, and a communication control unit 94 which carries out the control of the layer 1 to layer 3 of the ISDN subscriber lines 82 as well as the network control of the upper layers above the layer 4.

Now, the operation in this cipher communication system of FIG. 15 will be described for an exemplary case in which the terminal device #1 calls up the terminal device #2 to carry out the cipher communication between these terminal devices.

Figure 16:
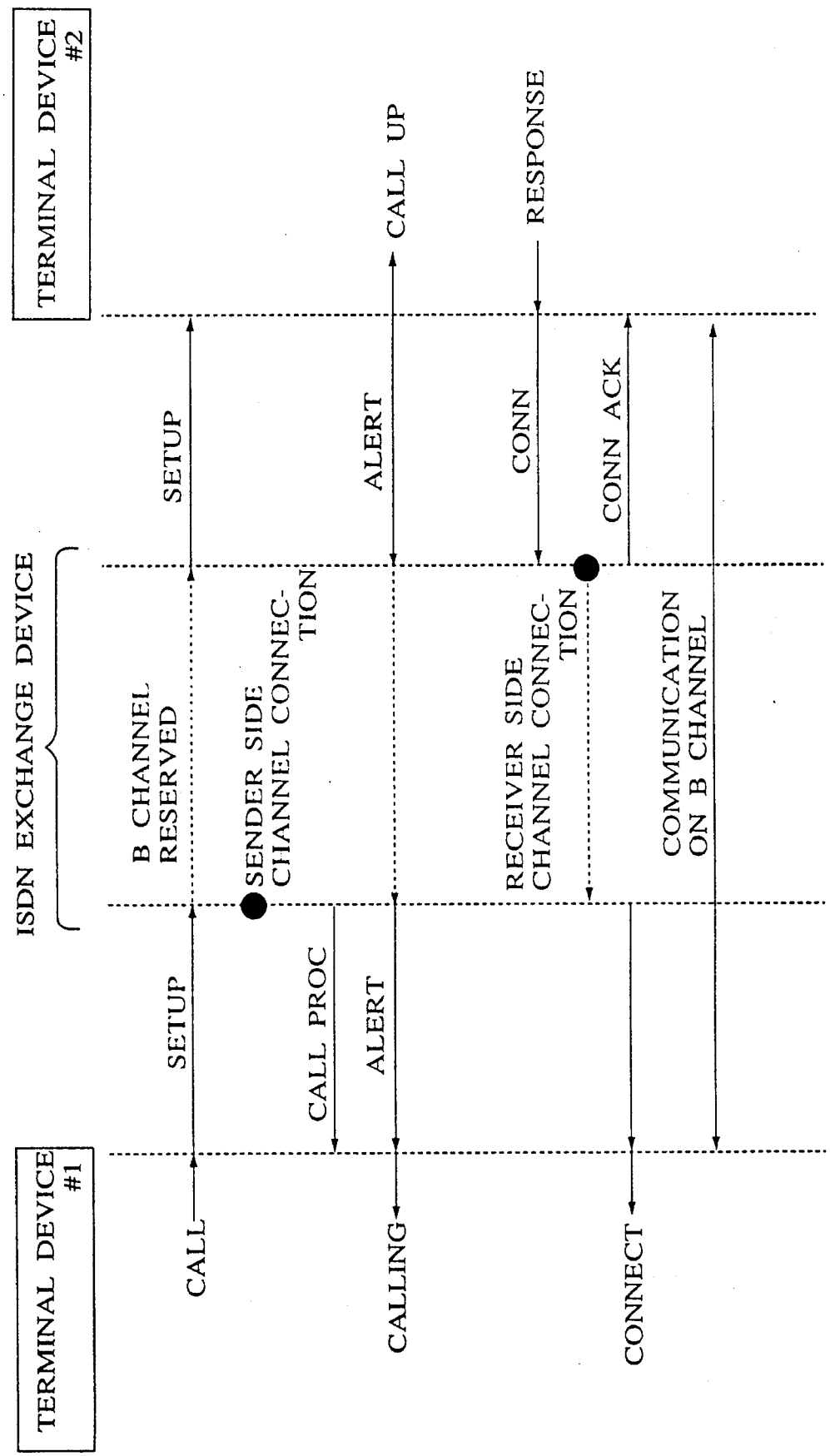
FIG. 16 is a sequence chart for the call connect procedure in the system of FIG. 15.

FIG. 16 shows a call connect procedure for carrying out a call connect by the line exchange to call up the communication target terminal device #2 from the terminal device #1 connected with the ISDN subscriber line 82. Namely, the call connect is initiated as "SETUP" (call set up request) message is transmitted to the exchange device 83 from the sender side terminal device #1. The exchange device 82 then reserve the B channel, while transmitting the "SETUP" message received from the sender side terminal device #1 to the receiver side terminal device #2, while transmitting "CALL PROC" (Call Proceeding: notice of the call set up in progress) message to the sender side terminal device #1. When the call up of the receiver side starts, "ALERT" (Alerting: notice of calling the receiver side) message is transmitted to the sender side. Then, when the receiver side makes the response by "CONN" (Connect) message, the exchange device 82 transmits "CONNACK" (Connect Acknowledge: acknowledgement for "CONN") message to the receiver side, and this completes the connection of the B channel.

In a case of the plain text communication (normal communication), when the call set up is finished by the sequence of FIG. 16, it becomes possible to carry out the communication between the terminal device #1 and the terminal device #2. However, in a case of a cipher communication, it is still necessary to take the synchronization of the start/end of the cipher communication between the terminal device #1 and the terminal device #2 after the call set up. This establishment of the synchronization is controlled by the synchronization establishment control unit 93 of the sender side terminal device #1.

Figure 17:
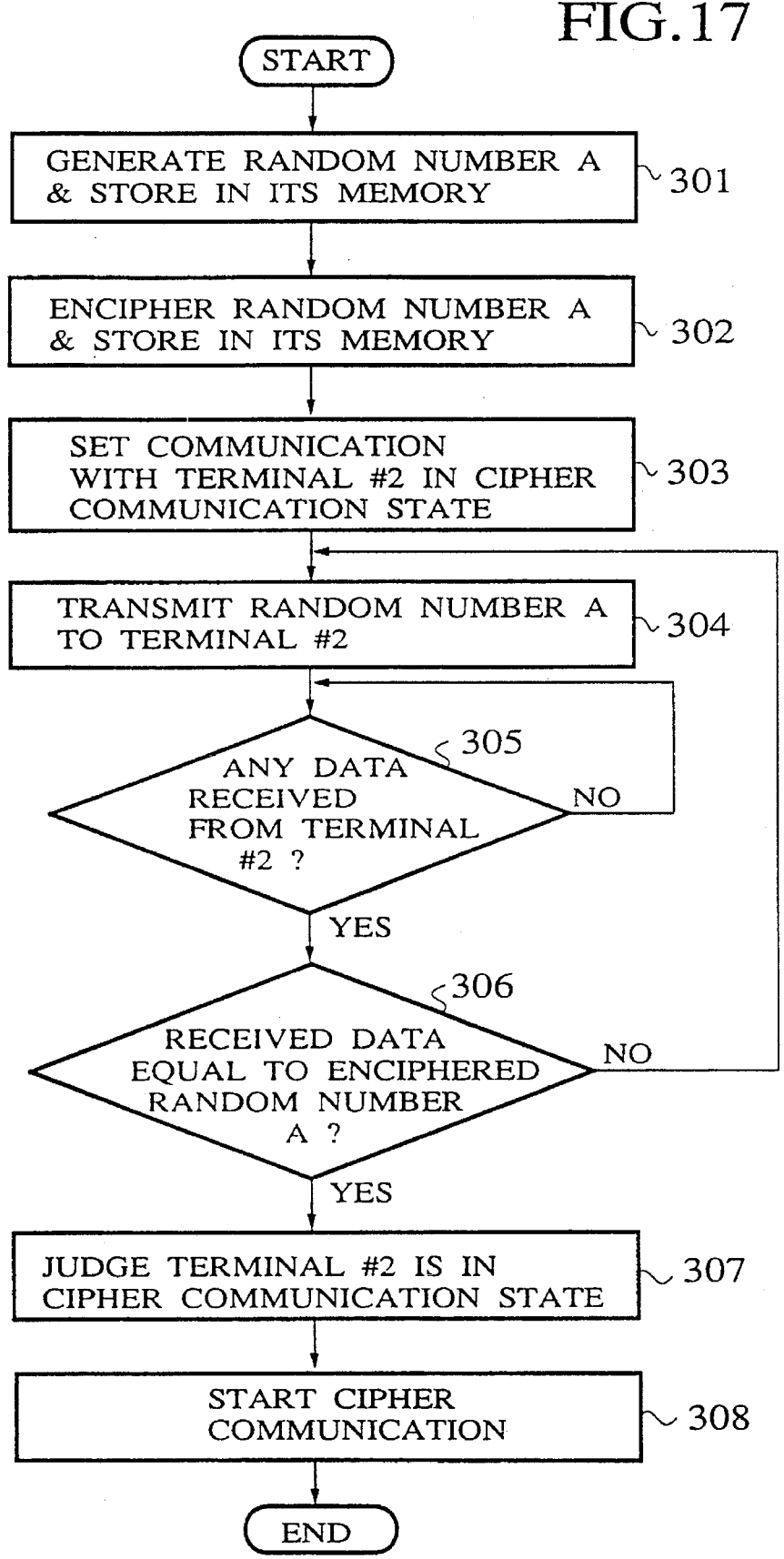
FIGS. 17 and 18 are flow charts for the operations of the terminal devices in the system of FIG. 15 in establishing the synchronization at a time of starting the cipher communication.
Figure 18:
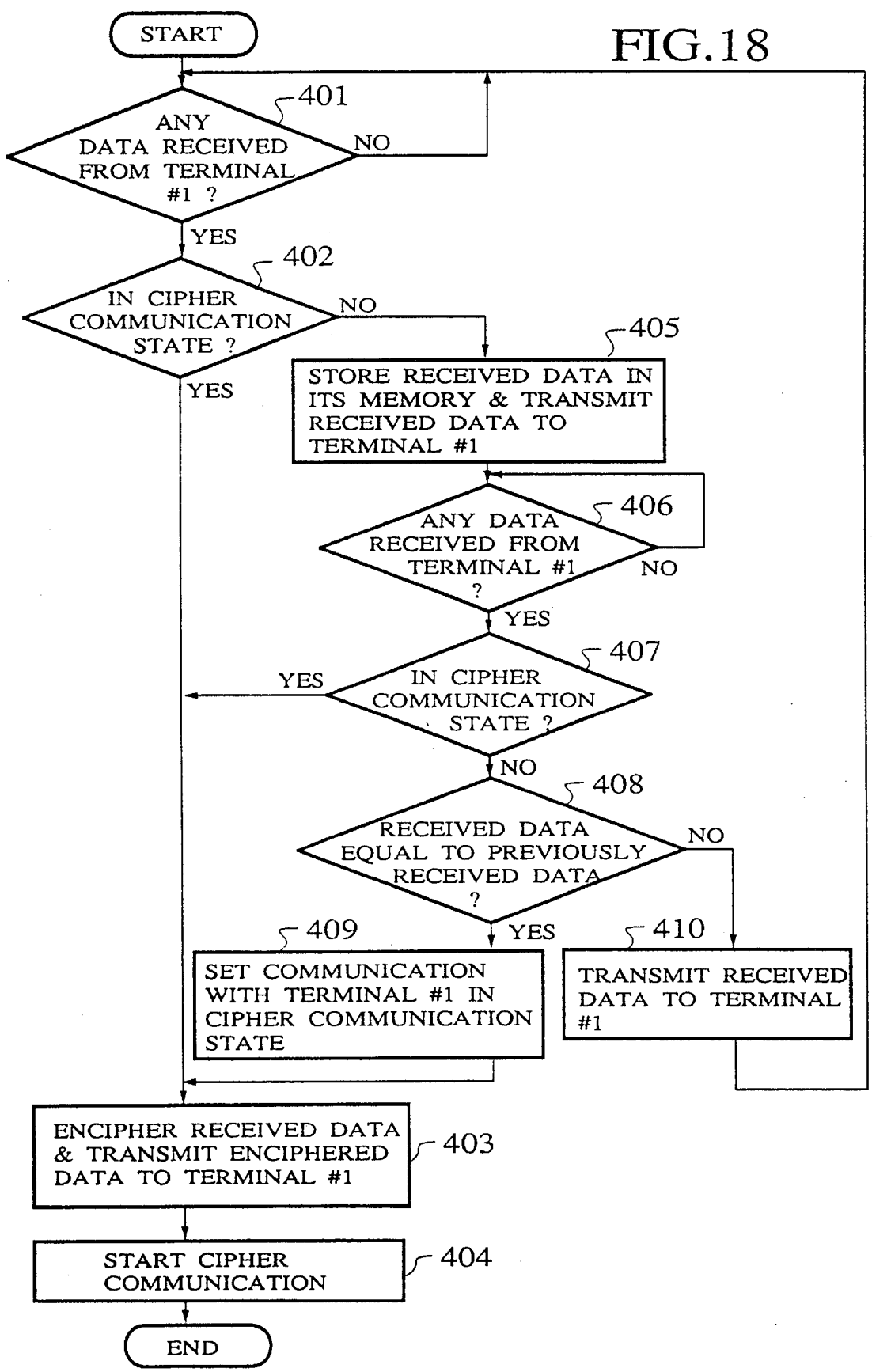

First, the procedure for establishing the synchronization at a time of starting the cipher communication is carried out according to the flow charts of FIGS. 17 and 18 at the terminal devices #1 and #2, respectively, as follows. Here, it is assumed that the session key to be used in the cipher communication is already distributed.

Namely, the synchronization establishment control unit 93 of the terminal device #1, generates the random number A at a time of startling the cipher communication, and stores the generated random number A on its memory (step 301), and then controls the data enciphering/deciphering unit 92 to encipher the generated random number A by the session key, and stores the enciphered random number on its memory (step 302).

Next, the communication control unit 94 is controlled to set up the communication with the terminal device #2 in the cipher communication state (step 303), and the random number A stored in its memory is transmitted to the terminal device #2 (step 304). Then, the synchronization establishment control unit 93 monitors the reception of the data from the terminal device #2 through the communication control unit 94 to see if any data is received from the terminal device #2 (step 305) until the data is received from the terminal device #2.

On the other hand, at the terminal device #2, after the call set up with the terminal device #1 is made, the synchronization establishment control unit 93 of the terminal device #2 monitors the reception of the data from the terminal device #1 through the communication control unit 94 to see if any data is received from the terminal device #1 (step 401) until the data is received from the terminal device #1. Then, when the data is received through the communication control unit 94, whether the communication state of its own terminal device #2 is in the cipher communication state or not is checked (step 402), and if so, the data enciphering/deciphering unit 92 is controlled to encipher the received data (random number A) by the already distributed session key, and the enciphered data is stored in its memory as well as transmitted to the terminal device #1 (step 403). Thereafter, the cipher communication with the terminal device #1 is started (step 404).

If the communication state of the terminal device #2 is in the plain text communication state, the received data (random number A) itself is stored In its memory as well as transmitted to the terminal device #1 (step 405), and the monitoring of the reception of the data from the terminal device #1 through the communication control unit 94 is resumed to see If any data is received from the terminal device #1 (step 406) until the data is received from the terminal device #1.

At the terminal device #1, when the data is received from the terminal device #2 through the communication control unit 94 at the step 305, the synchronization establishment control unit 93 checks whether the received data is equal to the enciphered random number stored in its memory or not (step 306). If they are equal, it is judged that the communication state of the terminal device #2 is in the cipher communication state (step 307) so that the cipher communication is started (step 308). Otherwise, it is judged that the communication state of the terminal device #2 is in the plain text communication state, and the operation returns to the step 304 to transmit the random number A to the terminal device #2 again and then monitor the reception of the data from the terminal device #2.

At the terminal device #2, when the data is received from the terminal device #1 through the communication control unit 94 at the step 406, the synchronization establishment control unit 93 checks whether the communication state of its own terminal device #2 is in the cipher communication state or not again (step 407). If so, then the operation proceeds to the steps 403 and 404 described above to start, the cipher communication, whereas otherwise (i.e., if it is still in the plain text communication state), then the received data and the previously received data are compared to see if they are equal (step 408). In a case they are equal it is judged that the terminal device #1 is requesting the cipher communication, so that the communication state with the terminal device #1 is set to the cipher communication state (step 409) and the operation proceeds to the steps 403 and 404 described above to start the cipher communication, whereas otherwise the received data itself is transmitted to the terminal device #1 (step 410) and the operation returns to the step 401 described above to repeat the same operation all over again.

Next, the procedure for establishing the synchronization at a time of ending the cipher communication is carried out according to the flow charts of FIGS. 19 and 20 at the terminal devices #1 and #2, respectively, as follows.

Namely, the synchronization establishment control unit 93 of the terminal device #1 generates the random number B at a time of ending the cipher communication, and stores the generated random number B on its memory (step 501), and sets the communication with the terminal device #2 in the plain text communication state (step 502). Then, the random number B stored in its memory is transmitted to the terminal device #2 through the communication control device 94 (step 503).

Then, the synchronization establishment control unit 93 monitors the reception of the data from the terminal device #2 through the communication control unit 94 to see If any data is received from the terminal device #2 (step 504) until the data is received from the terminal device #2.

On the other hand, at the terminal device #2, the synchronization establishment control unit 93 of the terminal device #2 monitors the reception of the data from the terminal device #1 through the communication control unit 94 to see if any data is received from the terminal device #1 (step 601) until the data is received from the terminal device #1. Then, when the data is received through the communication control unit 94, whether the communication state of its own terminal device #2 is in the plain text communication state or not is checked (step 602), and if so, the received data (random number B) itself is transmitted to the terminal device #1 (step 603) and the cipher communication is ended (step 604). If the communication state of the terminal device #2 is in the cipher communication state, the received data is stored in its memory, while the data enciphering/deciphering unit 92 is controlled to encipher the received data (random number B) by the already distributed session key and the enciphered data is transmitted to the terminal device #1 (step 605), and then the monitoring of the reception of the data from the terminal device #1 through the communication control unit 94 is resumed to see if any data is received from the terminal device #1 (step 606) until the data is received from the terminal device #1.

At the terminal device #1, when the data is received from the terminal device #2 through the communication control unit 94 at the step 504, the synchronization establishment control unit 93 checks whether the received data is equal to the random number B stored in its memory or not (step 505).

If they are equal, it is judged that the communication state of the terminal device #2 is set back to the plain text communication state (step 506) so that the cipher communication is ended (step 507). Otherwise, it is judged that the communication state of the terminal device #2 is still in the cipher communication state, and the operation returns to the step 503 to transmit the random number B to the terminal device #2 again and then monitor the reception of the data from the terminal device #2.

At the terminal device #2, when the data is received from the terminal device #1 through the communication control unit 94 at the step 606, the synchronization establishment control unit 93 checks whether the communication state of Its own terminal device #2 is in the plain text communication state or not again (step 607). If so, then the operation proceeds to the steps 603 and 604 described above to end the cipher communication, whereas otherwise (i.e., if it is still in the cipher communication state), then the received data and the previously received data are compared to see if they are equal (step 608). In a case they are equal it is judged that the terminal device #1 is requesting the ending of the cipher communication, so that the communication state with the terminal device #1 is set to the plain text communication state (step 609) and the operation proceeds to the steps 603 and 604 described above to end the cipher communication, whereas otherwise the received data is enciphered by the already distributed session key and the enciphered data is transmitted to the terminal device #1 (step 610), and then the operation returns to the step 601 described above to repeat the same operation all over again.

It is to be noted that the procedures for starting and ending the cipher communication in a case the terminal device #2 takes the Initiative is similar as those of FIGS. 17 to 20 described above for a case the terminal device #1 takes the initiative.

Figure 19:
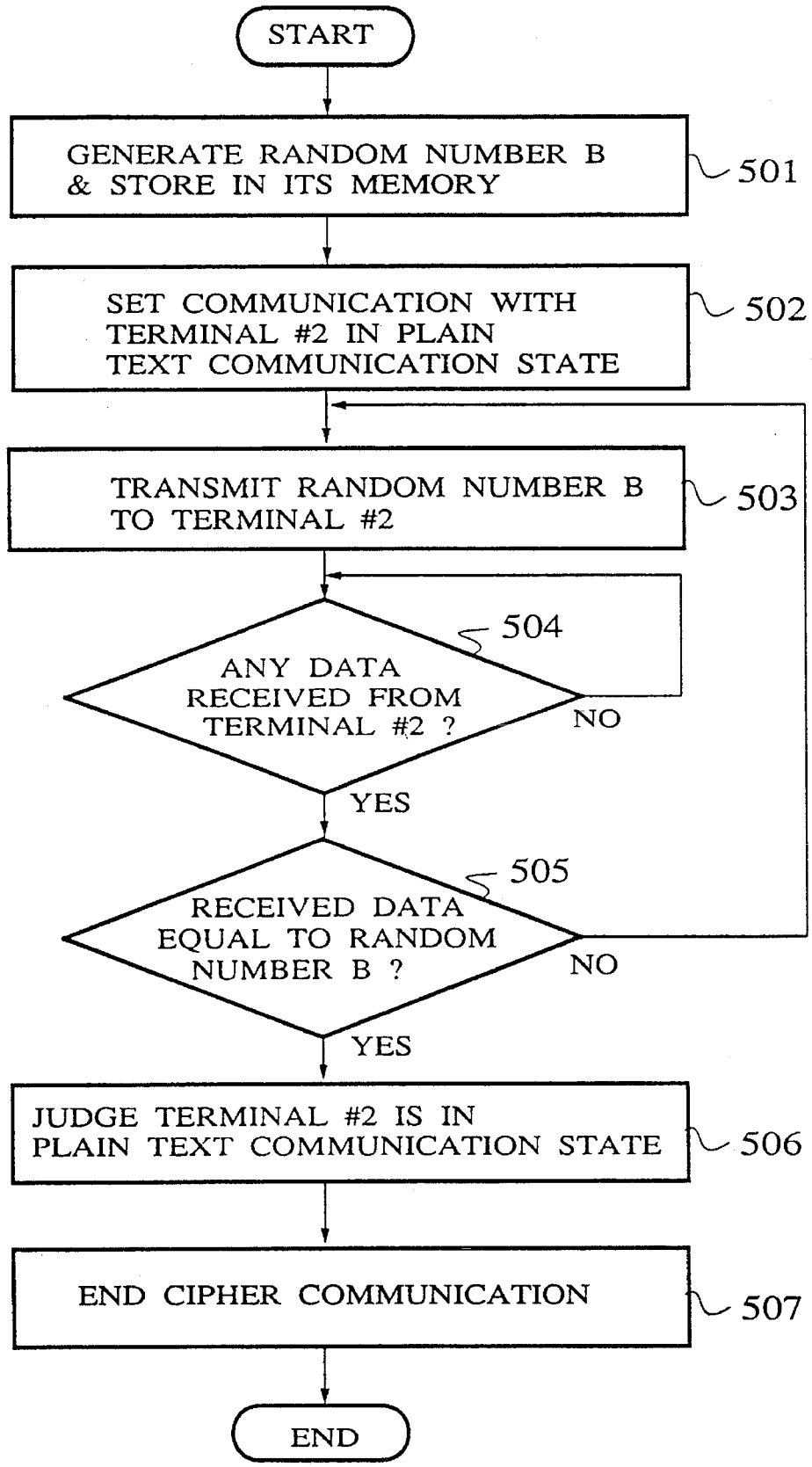
FIGS. 19 and 20 are flow charts for the operations of the terminal devices in the system of FIG. 15 in establishing the synchronization at a time of ending the cipher communication.
Figure 20:
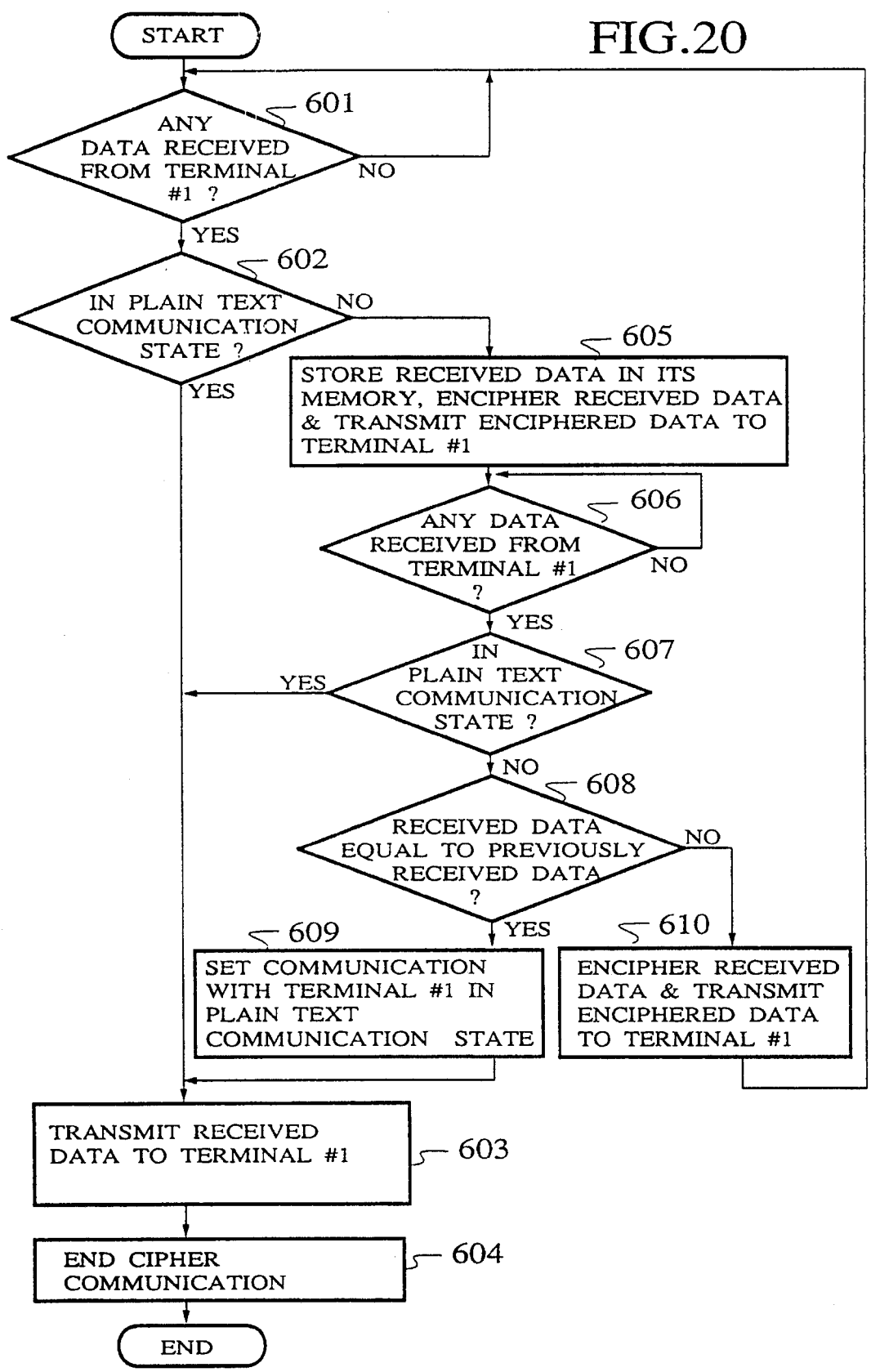

It is also to be noted that, instead of what is described above, the procedure of FIGS. 17 and 18 may be utilized for establishing the synchronization at a time of ending the cipher communication while the procedure of FIGS. 19 and 20 may be utilized for establishing the synchronization at a time of starting the cipher communication by interchanging the cipher communication state and the non-cipher communication state in the respective procedures.

It is further to be noted that the random number used in the above procedure as the synchronization data may be replaced by the other types of data such as a characteristic value such as that set up In the terminal device in advance, a sequence number which is counted up at the terminal device whenever it is used, and a time-stamp indiciating a value of a timer provided in the terminal device. Here, however, from a point of view of the security, it is preferable to use the type of data which is not easily guessed by the third person for this synchronization data.

Thus, according to this third embodiment, it becomes possible to establish the synchronization of the start and end of the cipher communication easily even in a case of transferring data in the data communication through a digital transmission path.

It is to be noted here that, besides those already mentioned above, many modifications and variations of the above embodiments may be made without departing from the novel and advantageous features of the present invention. Accordingly, all such modifications and variations are intended to be included wlthln the scope of the appended claims.

What is claimed is:

1. A method of cipher communication between first and second terminals, comprising the steps of:

generating a synchronization data at the first terminal, and transmitting the synchronization data from the first terminal to the second terminal after setting a communication state of the first terminal with respect to the second terminal as a cipher/non-cipher communication state;

checking a communication state of the second terminal with respect to the first terminal when the synchronization data transmitted from the first terminal is received at the second terminal;

returning a return data from the second terminal to the first terminal, the return data being provided by an enciphered synchronization data obtained by enciphering the synchronization data as received at the second terminal when the communication state of the second terminal with respect to the first terminal is the cipher/non-cipher communication state at the checking step, and by the synchronization data as received at the second terminal when the communication state of the second terminal with respect to the first terminal is not the cipher/non-cipher communication state at the checking step; and starting/ending the cipher communication at the first terminal only when the return data returned at the returning step is equal to the enciphered synchronization data obtained by enciphering the synchronization data generated at the generating step.

2. The method of claim 1, further comprising the steps of:

starting/ending the cipher communication at the second terminal when the communication state of the second terminal with respect to the first terminal is the cipher/non-cipher communication state at the checking step;

re-transmitting the synchronization data from the first terminal to the second terminal when the return data returned at the returning step is not equal to the enciphered synchronization data obtained by enciphering the synchronization data generated at the generating step and repeating the checking step again;

starting/ending the cipher communication at the second terminal after setting the communication state of the second terminal with respect to the first terminal as the cipher/non-cipher communication state in a case the communication state of the second terminal with respect to the first terminal is not the cipher/non-cipher communication state again when the checking step is repeated and the synchronization data re-transmitted at the re-transmitting step and received at the second terminal is equal to the synchronization data previously received at the second terminal; and returning the return data provided by the synchronization data as received at the second terminal from the second terminal to the first terminal when the synchronization data re-transmitted at the re-transmitting step and received at the second terminal is not equal to the synchronization data previously received at the second terminal.

3. The method of claim 1, wherein the synchronization data is given as any one of a random number, a characteristic value, a sequence number, and a time-stamp.

4. A method of cipher communication between first and second terminals, comprising the steps of:

generating a synchronization data at the first terminal, and transmitting the synchronization data from the first terminal to the second terminal after setting a communication state of the first terminal with respect to the second terminal as a non-cipher/cipher communication state;

checking a communication state of the second terminal with respect to the first terminal when the synchronization data transmitted from the first terminal is received at the second terminal;

returning a return data from the second terminal to the first terminal, the return data being provided by the synchronization data as received at the second terminal when the communication state of the second terminal with respect to the first terminal is the non-cipher/cipher communication state at the checking step, and by an enciphered synchronization data obtained by enciphering the synchronization data as received at the second terminal when the communication state of the second terminal with respect to the first terminal is not the non-cipher/cipher communication state at the checking step; and ending/starting the cipher communication at the first terminal only when the return data returned at the returning step is equal to the synchronization data generated at the generating step.

5. The method of claim 4, further comprising the steps of:

ending/starting the cipher communication at the second terminal when the communication state of the second terminal with respect to the first terminal is the non-cipher/cipher communication state at the checking step;

re-transmitting the synchronization data from the first terminal to the second terminal when the return data returned at the returning step is not equal to the synchronization data generated at the generating step and repeating the checking step again;

ending/starting the cipher communication at the second terminal after setting the communication state of the second terminal with respect to the first terminal as the non-cipher/cipher communication state in a case the communication state of the second terminal with respect to the first terminal is not the non-cipher/cipher communication state again when the checking step is repeated and the synchronization data re-transmitted at the re-transmitting step and received at the second terminal is equal to the synchronization data previously received at the second terminal; and returning the return data provided by the enciphered synchronization data obtained by enciphering the synchronization data as received at the second terminal from the second terminal to the first terminal when the synchronization data re-transmitted at the re-transmitting step and received at the second terminal is not equal to the synchronization data previously received at the second terminal.

6. The method of claim 4, wherein the synchronization data is given as any one of a random number, a characteristic value, a sequence number, and a time-stamp.

* * * * *